US012103310B2

(12) United States Patent
Hayashida et al.

(10) Patent No.: US 12,103,310 B2
(45) Date of Patent: Oct. 1, 2024

(54) LIQUID DISCHARGING DEVICE AND METHOD FOR PERFORMING MAINTENANCE OF LIQUID DISCHARGING DEVICE

(71) Applicant: BROTHER KOGYO KABUSHIKI KAISHA, Nagoya (JP)

(72) Inventors: Kenta Hayashida, Nagoya (JP); Misaki Takeuchi, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/425,022

(22) Filed: Jan. 29, 2024

(65) Prior Publication Data

US 2024/0165957 A1 May 23, 2024

Related U.S. Application Data

(63) Continuation of application No. 18/180,938, filed on Mar. 9, 2023, now abandoned.

(30) Foreign Application Priority Data

Mar. 31, 2022 (JP) ................................ 2022-060423

(51) Int. Cl.
*B41J 2/165* (2006.01)

(52) U.S. Cl.
CPC ....... *B41J 2/16552* (2013.01); *B41J 2/16511* (2013.01); *B41J 2/16585* (2013.01); *B41J 2/16514* (2024.05); *B41J 2002/16558* (2013.01)

(58) Field of Classification Search
CPC ......................... B41J 2/16552; B41J 2/16511; B41J 2/16585; B41J 2002/16514; B41J 2002/16558
See application file for complete search history.

(56) References Cited

U.S. PATENT DOCUMENTS 9,527,288 B2 12/2016 Naoe
10,618,291 B2 4/2020 Okuda
(Continued)

FOREIGN PATENT DOCUMENTS

JP 2003320674 A 11/2003
JP 2010150326 A 7/2010
(Continued)

OTHER PUBLICATIONS

Extended European Search Report issued Aug. 31, 2023 in European Patent Application No. 23161868.7, 9 pages.
(Continued)

*Primary Examiner* — Sharon Polk
(74) *Attorney, Agent, or Firm* — Element IP, PLC

(57) ABSTRACT

A liquid discharging device includes a head, a cap, a first wiper, a discharge channel, and a controller. The head ejects liquid from a nozzle. The cap is configured to abut against a nozzle surface at a covered position and to separate from the nozzle surface in a retracted position. The first wiper wipes the nozzle surface. The discharge channel connects an internal space of the cap to an outside of the cap. The controller executes a first maintenance process and a second maintenance process. In the first maintenance process, a first maintenance liquid contacts the cap in the retracted position and the first wiper. In the second maintenance process, a second maintenance liquid different from the first maintenance liquid is distributed to the internal space of the cap and the discharge channel.

21 Claims, 23 Drawing Sheets

(56) References Cited

U.S. PATENT DOCUMENTS

| | | | | |
|---|---|---|---|---|
| 2009/0315940 | A1 | 12/2009 | Chun et al. | |
| 2018/0264821 | A1* | 9/2018 | Sato | B41J 2/16544 |
| 2020/0016899 | A1* | 1/2020 | Ogasahara | B41J 2/16552 |
| 2020/0254761 | A1* | 8/2020 | Levy | B41J 2/16523 |
| 2021/0178789 | A1 | 6/2021 | Ogawa et al. | |

FOREIGN PATENT DOCUMENTS

| | | | |
|---|---|---|---|
| JP | 4802359 | B2 * | 10/2011 |
| JP | 2013154490 | A | 8/2013 |
| JP | 2014205330 | A | 10/2014 |
| JP | 2020023110 | A | 2/2020 |

OTHER PUBLICATIONS

Office Action issued Mar. 5, 2024 in corresponding Japanese Patent Application No. 2022-060423 (with machine English translation), 7 pages.

* cited by examiner

LIQUID DISCHARGING DEVICE AND METHOD FOR PERFORMING MAINTENANCE OF LIQUID DISCHARGING DEVICE

CROSS-REFERENCE TO RELATED APPLICATIONS

The present application is a continuation application of U.S. patent application Ser. No. 18/180,938, filed Mar. 9, 2023, which claims priority to Japanese Patent Application No. 2022-060423 filed Mar. 31, 2022. The contents of these applications are incorporated herein by reference in their entirety.

BACKGROUND OF DISCLOSURE

Technical Field

The present disclosure relates to a liquid discharging device that performs maintenance on a cap covering a nozzle surface of a head and on a wiper that wipes the nozzle surface, and a method for performing maintenance of a liquid discharging device.

Background Art

The inkjet input-output device described is known as a liquid discharging device that ejects liquid from the nozzles of a head and prints on a sheet, for example. The inkjet recording device, for example, has capping means for capping a nozzle opening of the head. The inkjet recording device caps the nozzle openings after cleaning the inside of channels of the capping means with a cleaning liquid when the power is shut off.

SUMMARY OF THE DISCLOSURE

According to an aspect of the present disclosure, a liquid discharging device, includes: a head to eject liquid from a nozzle which is an opening in a nozzle surface of the head, a cap configured to abut against the nozzle surface at a covered position and to separate from the nozzle surface in a retracted position, a first wiper to wipe the nozzle surface, a discharge channel connecting an internal space of the cap to an outside of the cap, and a controller. The controller executes: a first maintenance process in which a first maintenance liquid is brought into contact with the cap in the retracted position and the first wiper, and a second maintenance process in which a second maintenance liquid different from the first maintenance liquid is distributed to the internal space of the cap and the discharge channel.

According to another aspect of the present disclosure, a method for performing maintenance of a liquid discharging device, includes: bringing a first maintenance liquid into contact with a first wiper and a cap positioned in a retracted position separated from a nozzle surface of a head of a liquid discharging device; and providing a second maintenance liquid different from the first maintenance liquid to an internal space of the cap and a discharge channel connecting the internal space and an outside of the cap.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
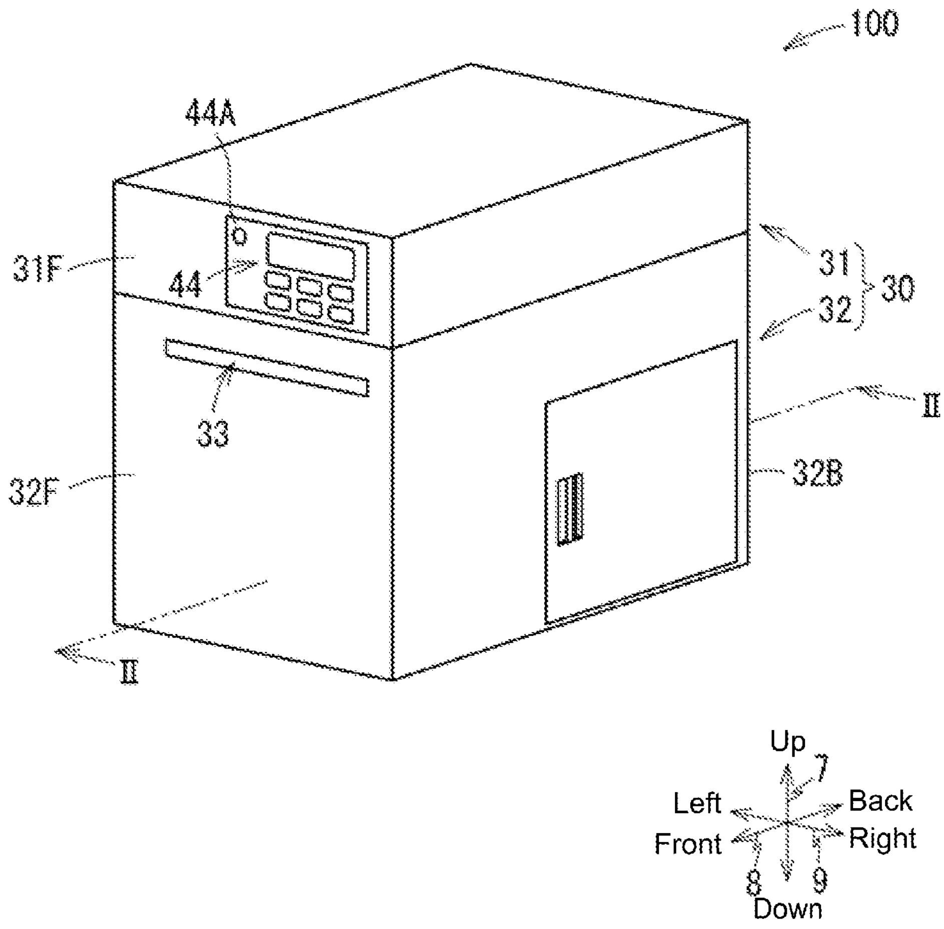
FIG. 1 is an appearance perspective view of an image recording device 100 according to an embodiment of the present disclosure.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

(1) The liquid discharging device according to an embodiment of the present disclosure contains a head that ejects liquid from a nozzle, which is an opening a nozzle surface has, a cap that contacts the nozzle surface in the covered position and separates from the nozzle surface in the retracted position, a first wiper that wipes the nozzle surface, a discharge channel that connects the internal space of the cap to the outside, and a controller. The controller performs a first maintenance process of bringing the first maintenance liquid into contact with the cap and the first wiper in the retracted position, and a second maintenance process of distributing the second maintenance liquid, which is different from the first maintenance liquid, into the internal space of the cap and the discharge channel.

Liquid ejected from the nozzle of the head can adhere to caps and the like. For example, liquid may remain in the internal space or channels of the cap, or liquid may adhere to a part of the cap that comes in contact with the nozzle surface. The first maintenance liquid cleans the cap and the first wiper, and the second maintenance liquid cleans the internal space of the cap and the discharge channel; therefore, maintenance is performed, suitable for each member to which the liquid ejected from the nozzle has adhered.

(2) The liquid discharging device may also contain a water-absorbent cleaning member that retains the first maintenance liquid; and the controller may bring the cleaning member into contact with the cap positioned in the retracted position and the first wiper, during the first maintenance process.

(3) The liquid discharging device may also contain a tank that stores the second maintenance liquid and a supply channel that supplies liquid from the tank to the internal space of the cap. In the above second maintenance process, the controller may cause the second maintenance liquid supplied to the internal space of the cap through the supply channel to flow to the discharge channel.

The internal space of the cap and the discharge channel, where liquid ejected from the nozzle tends to adhere, is cleaned by the second maintenance liquid.

(4) The controller may execute a third maintenance process in which the second maintenance liquid is stored in the internal space of the cap positioned in the covered position.

The internal space of the cap in the covered position is maintained at a high humidity, making it difficult for the liquid to dry out in the nozzle.

(5) The controller may cause: the second maintenance liquid to flow into the internal space of the cap at a first flow velocity, in the second maintenance process, and the second maintenance liquid to flow into the internal space of the cap at a second flow velocity, in the third maintenance process; wherein the second flow velocity is slower than the first flow velocity.

In the third maintenance process, the second maintenance liquid is less likely to overflow from the internal space of the cap.

(6) The controller may perform a fourth maintenance process in which the nozzle surface is wiped by the first wiper.

Liquid adhering to the nozzle surface is wiped off.

(7) The liquid discharging device may also include a water-absorbent second wiper; wherein the second wiper holds the second maintenance liquid, and the controller cleans the nozzle surface by bringing the second wiper into contact with the nozzle surface in the fourth maintenance process.

(8) The controller may cause the first wiper to wipe the nozzle surface after the second wiper has cleaned the nozzle surface in the fourth maintenance process.

(9) The liquid discharging device may also contain a channel for supplying the second maintenance liquid to the second wiper; wherein the controller supplies the second maintenance liquid to the second wiper through the channel, and then discharges the second maintenance liquid from the above channel in the fourth maintenance process.

(10) The liquid discharging device may also contain a plurality of the heads, a plurality of the caps, supply and discharge channels connected to each of the internal spaces of the caps, a suction pump provided in each of the discharge channels, and a motor; wherein the controller drives the motor to operate the suction pump, and the sum of the volume of the supply channel, the volume upstream of the suction pump in the discharge channel, and the volume of the internal space of the cap is equal for each of the plurality of caps.

The amount of second maintenance liquid that flows into the internal space of each cap can be equalized by operating a plurality of suction pumps while using a common motor to drive a plurality of suction pumps.

(11) The viscosity of the first maintenance liquid may be greater than the viscosity of the second maintenance liquid.

The second maintenance liquid facilitates cleaning the internal space of the cap and the discharge channel.

(12) The evaporation rate of the first maintenance liquid may be lower than the evaporation rate of the second maintenance liquid.

The first maintenance liquid does not readily evaporate from the cleaning member.

(13) A water-soluble organic solvent included in the first maintenance liquid in the maximum amount may be the same as a water-soluble organic solvent included in the second maintenance liquid in the maximum amount.

When the first maintenance liquid and the second maintenance liquid are mixed, agglomeration or the like will not readily occur.

(14) The liquid ejected by the nozzle may contain resin microparticles and water.

(15) The viscosity V1 of the first maintenance liquid, the viscosity V2 of the second maintenance liquid, and the viscosity V3 of the liquid ejected by the nozzle may have a relationship such that: viscosity V1>viscosity V3>viscosity V2.

(16) The surface tension T1 of the first maintenance liquid may be greater than the surface tension T3 of the liquid ejected by the nozzle; and the surface tension T2 of the second maintenance liquid may be greater than the surface tension T3.

(17) The evaporation rate E1 of the first maintenance liquid, the evaporation rate E2 of the second maintenance liquid, and the evaporation rate E3 of the liquid ejected from the nozzle may be in a relationship such that: evaporation rate E3>evaporation rate E2>evaporation rate E1.

(18) The present disclosure may provide a maintenance method, including: a first maintenance step of bringing the first wiper and the cap positioned in a retracted position separated from the nozzle surface of the head into contact with a cleaning member that holds the first maintenance liquid; and a second maintenance step of providing a second maintenance liquid different from the first maintenance liquid to the internal space of the cap and the discharge channel connected to internal space.

The present disclosure can perform optimal maintenance for caps and wipers to which a liquid ejected from a nozzle adheres.

Preferred embodiments of the present disclosure will be described below. Note that the present embodiment naturally is merely one Embodiment of the present disclosure, and that the Embodiment can be changed to an extent that the gist of the present disclosure is not altered. In the following description, the vertical direction 7 is defined based on the state in which the image recording device 100 is installed for use (the state in FIG. 1), the front-to-back direction 8 is defined with the side on which the discharge port 33 is provided as the close side (front side), and the left-right direction 9 is defined as viewed from the close side (front) of the image recording device 100.

[External Configuration of Image Recording Device 100]

An image recording device 100 (an example of a liquid discharging device) illustrated in FIG. 1 records an image on a sheet S forming a rolled body 37 (see FIG. 2) by an inkjet recording method.

As illustrated in FIG. 1, the image recording device 100 includes a housing 30. The housing 30 has an upper housing 31 and a lower housing 32. The upper housing 31 and the lower housing 32 are generally a rectangular body as a whole, and are large enough to be placed on a desk. In other words, the image recording device 100 is suitable for use while being placed on a desk. Of course, the image recording device 100 may be placed on the floor or on a rack for use.

Figure 2:
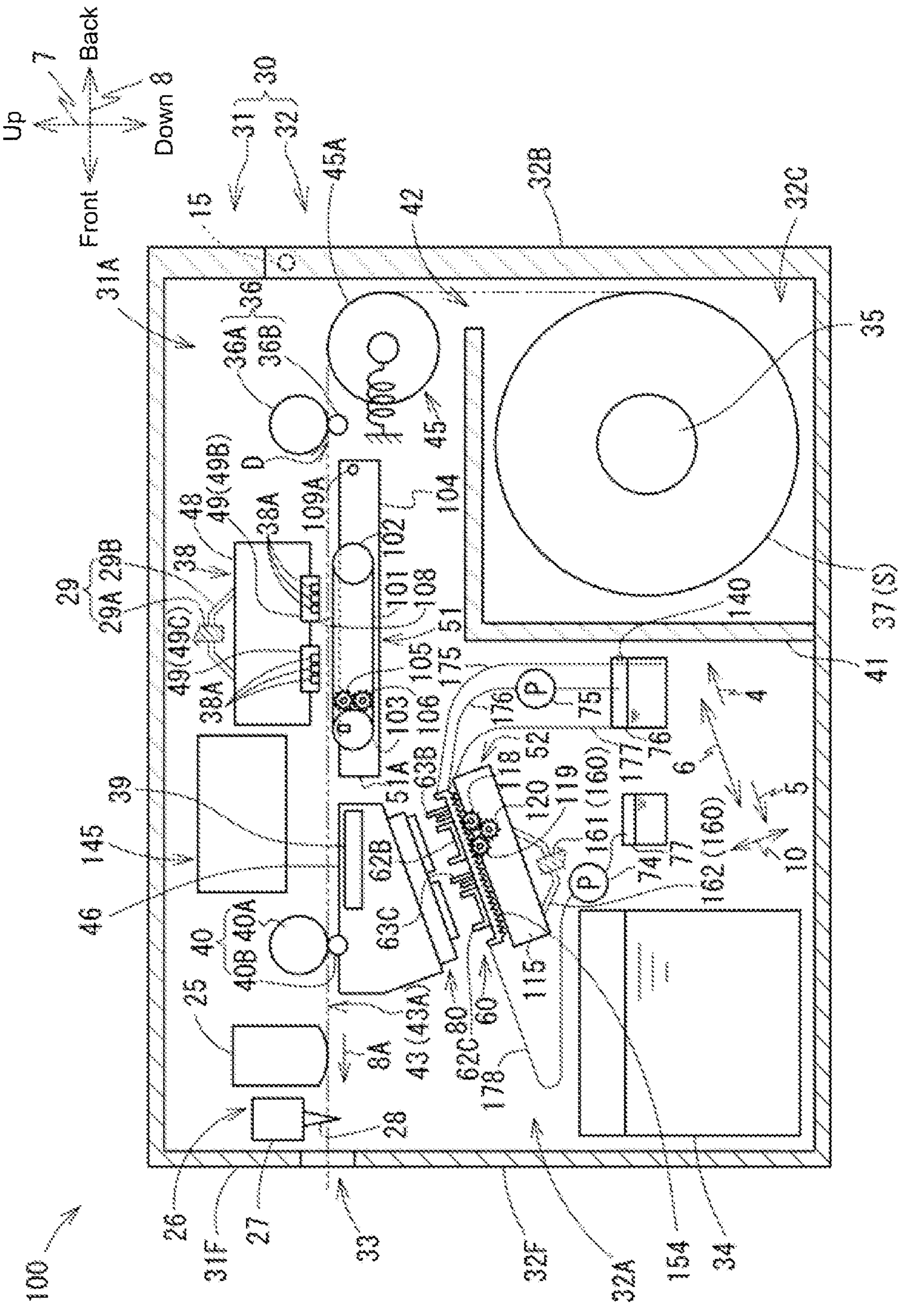
FIG. 2 is a cross-sectional view illustrating the II-II cross section of FIG. 1, indicating a state in which the head 38 is at a recording position, the first support mechanism 51 is at a first orientation, and the maintenance mechanism 60 is at a standby position.

As illustrated in FIG. 2, the housing 30 is divided into an internal space 31A inside the upper housing 31 and an internal space 32A inside the lower housing 32, as seen from the outside.

Figure 3:
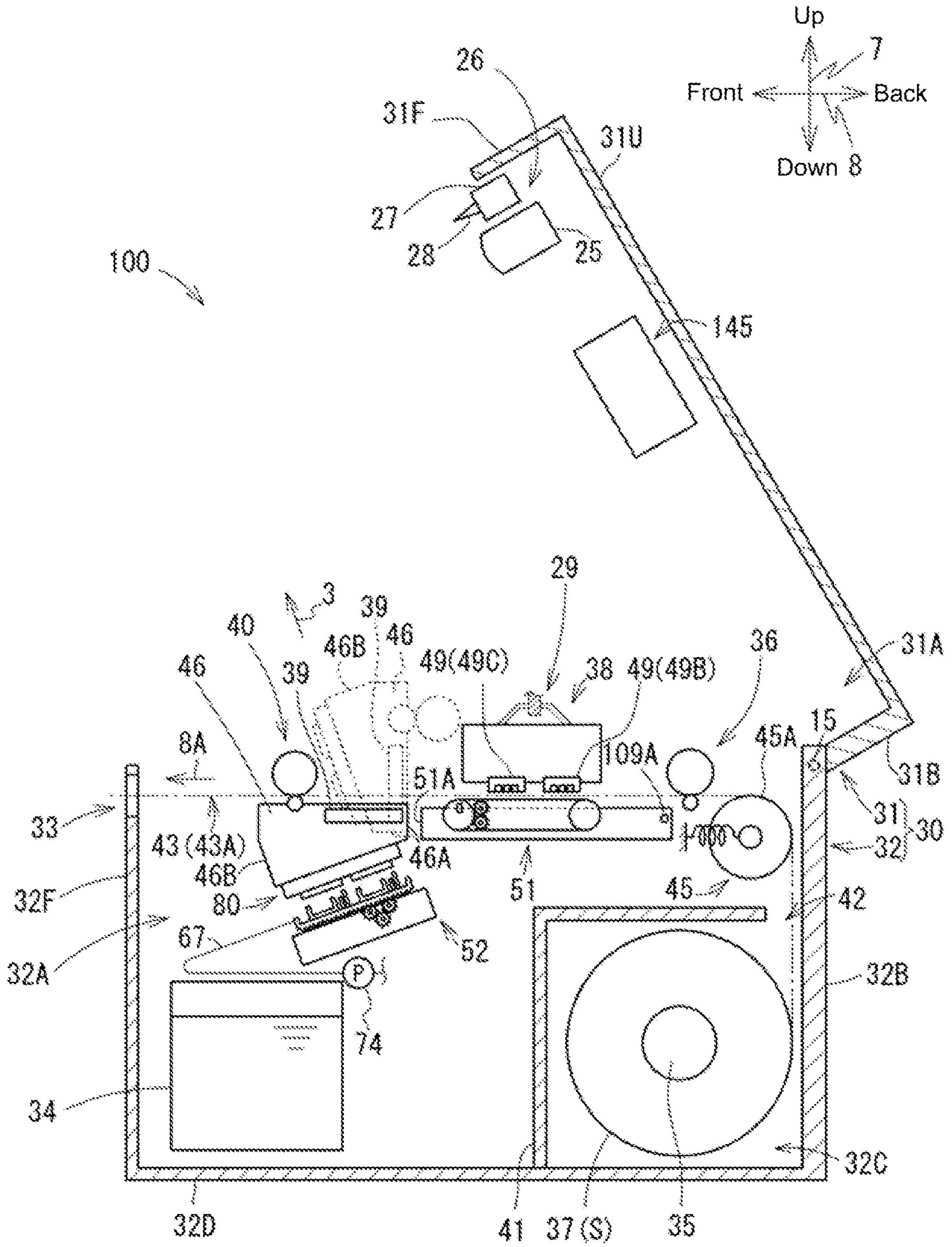
FIG. 3 is a cross-sectional view illustrating a state in which the upper housing 31 in FIG. 2 is in an open position.

As illustrated in FIGS. 2 and 3, the upper housing 31 is rotatably supported by the lower housing 32. The upper housing 31 is rotatable around a rotation shaft 15 that is provided on a rear lower end part and extends in the left-right direction 9, between a closed position illustrated in FIG. 2 and an open position illustrated in FIG. 3.

As illustrated in FIG. 1, a slit-shaped discharge port 33 elongated in the left-right direction 9 is formed in the front surface 32F of the lower housing 32. A sheet S on which an image has been recorded (see FIG. 2) is discharged from the discharge port 33.

An operating panel 44 is provided on the front surface 31F of the upper housing 31. The user provides inputs to the operating panel 44 to operate the image recording device 100 and confirms various settings. The operating panel 44 has a display part 44A for indicating that a lid member 82, which will be described later, is mounted on the support member 81.

[Internal Configuration of Image Recording Device 100]

Figure 16:
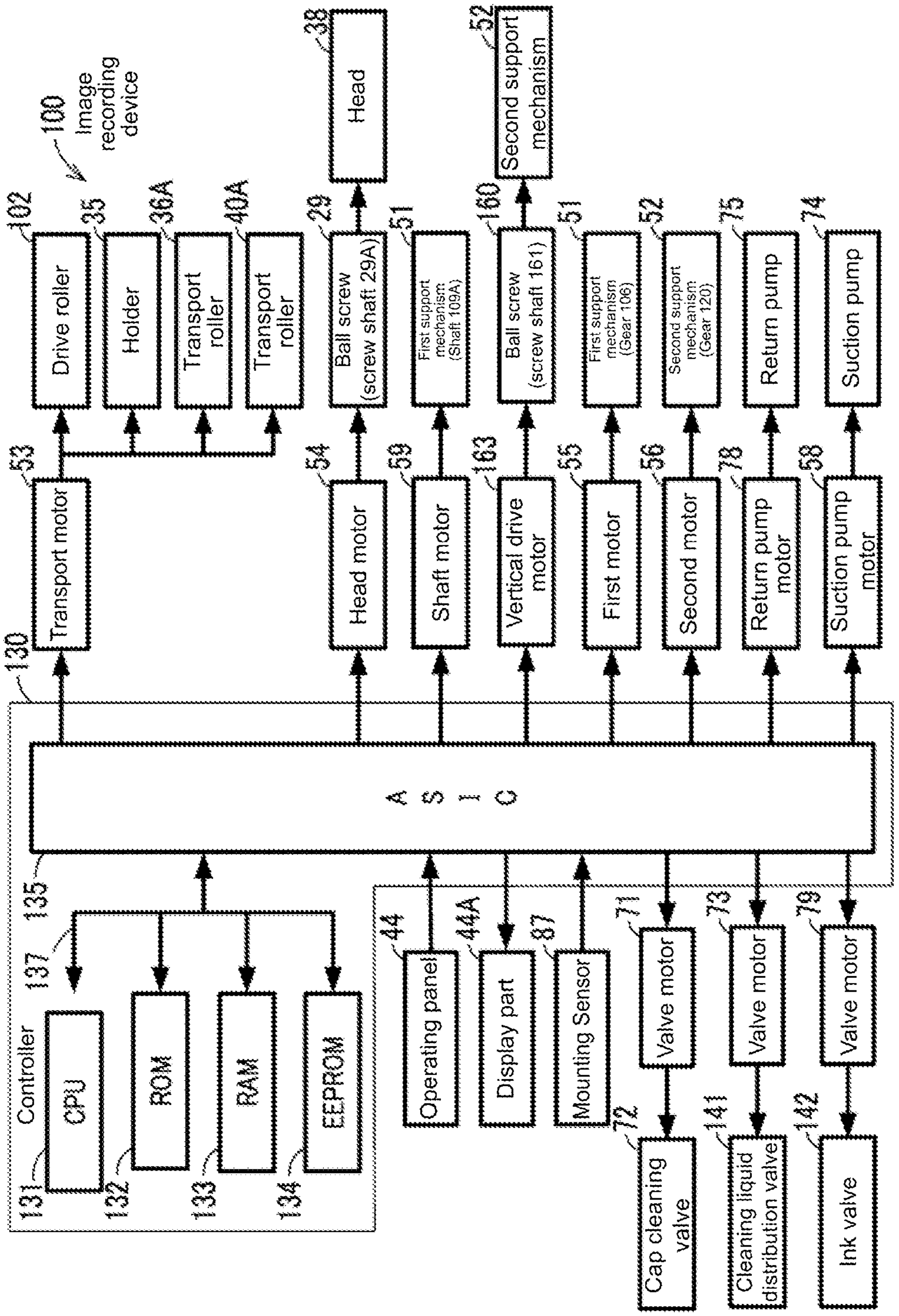
FIG. 16 is a block diagram of an image recording device 100.

As illustrated in FIG. 2, the internal spaces 31A and 32A include a holder 35, a tensioner 45, a transport roller pair 36, a transport roller pair 40, a head 38, a first support mechanism 51, a heater 39, a support part 46, a second support mechanism 52, CIS 25, a cutter unit 26, an ink tank 34, a cleaning liquid tank 76, a waste liquid tank 77, a maintenance mechanism 60, a wiper cleaning mechanism 80, and a controller 130 (see FIG. 16). Although not illustrated in FIG. 2, the controller 130 is provided in the internal space 32A (see FIG. 16). The controller 130 controls operation of the image recording device 100.

A partition wall 41 is provided in the internal space 32A. The partition wall 41 partitions the rear lower portion of the internal space 32A to define the sheet storage space 32C. The sheet storage space 32C is enclosed by the partition wall 41 and the lower housing 32.

A roll body 37 is stored in the sheet storage space 32C. The roll body 37 has a core tube and a long sheet S. The sheet S is wound around the core tube in a roll shape in the circumferential direction of the axis of the core tube.

As illustrated in FIG. 2, a holder 35 extending in the left-right direction 9 is positioned in the sheet storage space 32C. When mounted, the holder 35 supports the roll body 37 so that the axis of the core tube of the roll body 37 is in the left-right direction 9 and the roll body 37 is rotatable around the axis in the circumferential direction. The holder 35 is rotated by a driving force transmitted from a transport motor 53 (see FIG. 16). As the holder 35 rotates, the roll body 37 supported by the holder 35 also rotates.

As illustrated in FIG. 2, the sheet storage space 32C opens upward at a rear portion. A gap 42 is formed between the partition wall 41 and the rear surface 32B, that is, above a rear end of the roll body 37. As the transport roller pairs 36 and 40 rotate, the sheet S is drawn upward from the rear end of the roll body 37 and guided to the tensioner 45 through the gap 42.

The tensioner 45 is positioned above the partition wall 41 in the rear portion of the internal space 32A. The tensioner 45 has an outer peripheral surface 45A facing the outside of the lower housing 32. The upper end of the outer peripheral surface 45A is positioned at substantially the same vertical position as a nip D of the transport roller pair 36 in the vertical direction 7.

The sheet S pulled out from the roll body 37 is caught on and abuts against the outer peripheral surface 45A. The sheet S curves forward along the outer peripheral surface 45A, extends in the transport direction 8A, and is guided by the transport roller pair 36. The transport direction 8A is forward along the front-to-back direction 8.

The transport roller pair 36 is positioned in front of the tensioner 45. The transport roller pair 36 has a transport roller 36A and a pinch roller 36B. The transport roller 36A and the pinch roller 36B form a nip D by contacting each other at substantially the same vertical position as the upper end of the outer peripheral surface 45A.

A transport roller pair 40 is positioned in front of the transport roller pair 36. The transport roller pair 40 has a transport roller 40A and a pinch roller 40B. The transport roller 40A and the pinch roller 40B contact each other at substantially the same vertical position as the upper end of the outer peripheral surface 45A to form a nip.

The transport rollers 36A, 40A are rotated by a driving force transmitted from the transport motor 53 (see FIG. 16). The transport roller pair 36 nips and rotates the sheet S extending from the tensioner 45 in the transport direction 8A, thereby feeding the sheet S along the transport surface 43A of the transport path 43, described below, in the transport direction 8A. The transport roller pair 40 nips and rotates the sheet S fed from the transport roller pair 36 to feed the sheet S in the transport direction 8A. Furthermore, the sheet S is pulled out from the sheet storage space 32C toward the tensioner 45 through the gap 42 due to the rotation of the transport roller pairs 36 and 40.

As illustrated in FIG. 2, a transport path 43 extending from the upper end of the outer peripheral surface 45A to the discharge port 33 is formed in the internal space 32A. The transport path 43 extends substantially linearly along the transport direction 8A, and is a space through which the sheet S can pass. Specifically, the transport path 43 is along the transport direction 8A and the transport surface 43A extending in the left-right direction 9 and extending in the transport direction 8A. Note that in FIG. 2, the transport surface 43A is indicated by a two-pointed chain line indicating the transport path 43. The transport path 43 is partitioned by guide members (not illustrated) which are positioned spaced apart in the vertical direction 7, a head 38, a transport belt 101, a support part 46, a heater 39, and the like. In other words, the head 38, the transport belt 101, the supporting part 46, and the heater 39 are positioned along the transport path 43.

The head 38 is positioned above the transport path 43 and downstream of the transport roller pair 36 in the transport direction 8A. The head 38 has a plurality of nozzles 38A that open on a nozzle surface 50 (see FIG. 4). Ink (one example of the liquid) is ejected downward from the plurality of nozzles 38A toward the sheet S supported by the transport belt 101. Thus, an image is recorded on the sheet S. The configuration of the head 38 will be described later.

The first support mechanism 51 is positioned downstream of the transport roller pair 36 in the transport direction 8A and below the transport path 43. The first support mechanism 51 faces the head 38 and is below the head 38. The first support mechanism 51 has a transport belt 101 and a support member 104. The transport belt 101 supports the sheet S which is transported in the transport direction 8A by the transport roller pair 36 and positioned immediately below the head 38. The transport belt 101 transports the supported sheet S in the transport direction 8A. The support member 104 can support the maintenance mechanism 60. The configuration of the first support mechanism 51 is described later.

The heater 39 is positioned downstream of the head 38 in the transport direction 8A and upstream of the transport roller pair 40 in the transport direction 8A below the transport path 43. The heater 39 is supported by the frame in front of the first support mechanism 51 and extends in the left-right direction 9. The heater 39 has a heat transfer plate (not illustrated) and a film heater (not illustrated). The heat transfer plate is composed of metal, and has support surfaces extending in the front, rear, left, and right directions at substantially the same vertical positions as the transport surface 108 of the transport belt 101. The sheet S delivered from the first support mechanism 51 is transported forward on the support surface of the heat transfer plate. A film heater is fixed to the lower surface of the heat transfer plate and generates heat as controlled by the controller 130. This heat is transferred to the sheet S on the heat transfer plate via the heat transfer plate. In addition, heat from the heater 39 is recovered by a duct 145 provided above the heater 39.

The duct 145 is provided above the transport path 43, downstream of the head 38 in the transport direction 8A and upstream of the transport roller pair 40.

The support part 46 is positioned below the transport path 43. The support part 46 is positioned downstream of the head 38 and the first support mechanism 51 in the transport direction 8A. A heater 39 is positioned on a rear portion of the support part 46. A front portion of the support part 46 faces the transport roller 40A. The support part 46 is positioned upstream of the cutter unit 26 in the transport direction 8A.

The support part 46 is supported by the lower housing 32 so as to be rotatable about a shaft (not illustrated) extending in the left-right direction 9. As illustrated in FIG. 3, when the upper housing 31 is in the open position, the support part 46 can be rotated between a horizontal position indicated by the solid line in FIG. 3 and the vertical position indicated by the dashed line in FIG. 3.

When the support part 46 is in the horizontal position, the pivot tip end 46B of the support part 46 is positioned forward (downstream in the transport direction 8A) of the pivot base end 46A. When the support part 46 is in the horizontal position, the support part 46 constitutes a portion of the transport path 43 and can support the sheet S transported in the transport direction 8A by the transport belt 101. When the support part 46 is in the vertical position, the pivot tip end 46B of the support part 46 is positioned higher than when the support part 46 is in the horizontal position, such that the maintenance mechanism 60 can be exposed to the outside. The shaft of the support part 46 is provided at the rear end part of the support part 46 and extends in the left-right direction 9.

The second support mechanism 52 is supported by the lower housing 32 so as to be movable in an orthogonal direction 10 orthogonal to the sloping direction 6 and the left-right direction 9. The second support mechanism 52 can support the maintenance mechanism 60. The configuration of the second support mechanism 52 is described later.

The CIS 25 is positioned above the transport path 43 and downstream of the transport roller pair 40 in the transport direction 8A. The CIS 25 can read an image on a printed surface of a sheet.

The cutter unit 26 is positioned above the transport path 43 and downstream of the CIS 25 in the transport direction 8A. The cutter unit 26 has a cutter 28 mounted on a cutter carriage 27. Movement of the cutter 28 cuts the sheet S positioned on the transport path 43 along the left-right direction 9.

The ink tank 34 stores ink. Ink is a liquid containing pigments and the like. Ink is supplied from the ink tank 34 to the head 38 through a tube not illustrated in the drawings. The tube connecting the ink tank 34 to the head 38 is provided with an ink valve 142 (see FIG. 16). The ink valve 142 opens and closes the channel which is the internal space of the tube.

The cleaning liquid tank 76 stores the second maintenance liquid. The second maintenance liquid is used to clean the nozzle 38A and nozzle surface 50 of the head 38. The cleaning liquid tank 76 is positioned below the second support mechanism 52, as described later. The cleaning liquid tank 76 has an atmospheric connecting channel 140 (see FIG. 2) that connects an air layer formed in the tank to the outside. The cleaning liquid tank 76 has a cleaning liquid distribution valve that opens and closes the atmospheric connecting channel 140. The waste liquid tank 77 is a container where the second maintenance liquid is discharged.

The maintenance mechanism 60 is for performing maintenance on the head 38. The maintenance mechanism 60 is configured to be movable, and is moved directly below the head 38 when maintenance of the head 38 is performed (see FIG. 17).

Figure 17:
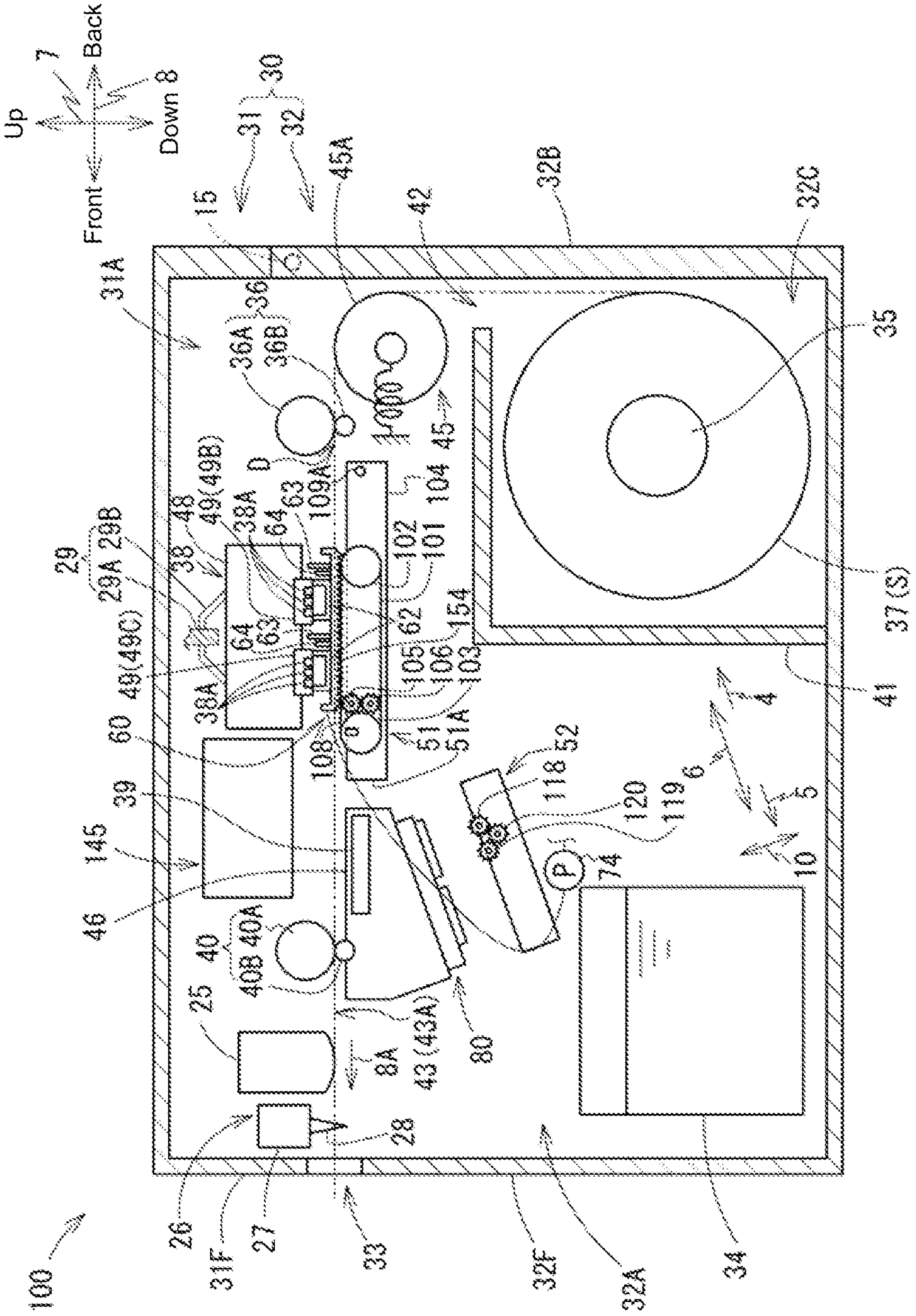
FIG. 17 is a cross-sectional view illustrating the II-II cross section of FIG. 1, indicating a state in which the head 38 is at a capped position, the first support mechanism 51 is at a first orientation, and the maintenance mechanism 60 is at a maintenance position.
Figure 18:
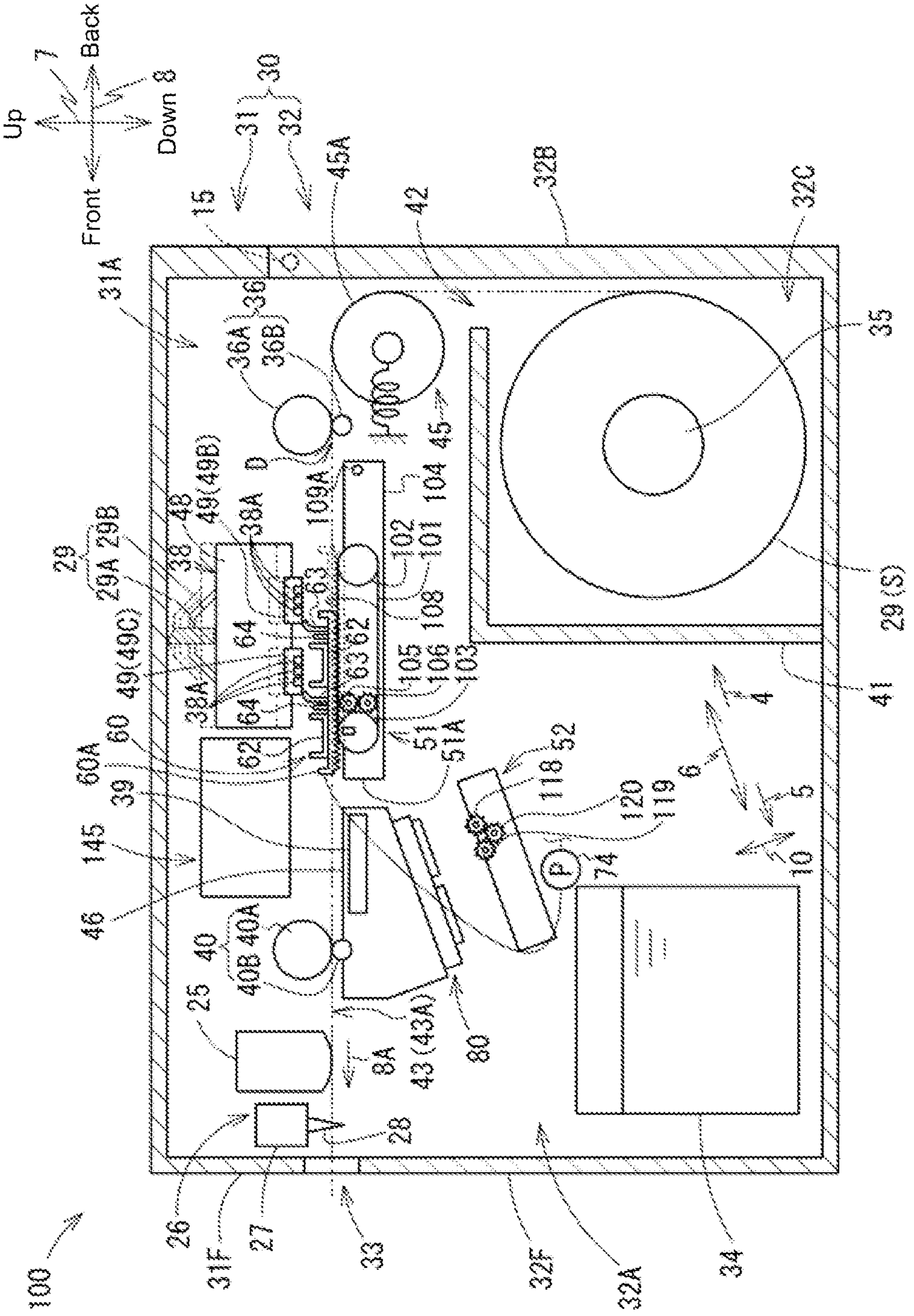
FIG. 18 is a cross-sectional view illustrating the II-II cross section of FIG. 1, indicating a state in which the head 38 is at a wiping position, the first support mechanism 51 is at a first orientation, and the maintenance mechanism 60 is at a wiping position.

Maintenance of the head 38 includes a purge process, cap cleaning, wiping, and the like. Purge process is, as illustrated in FIG. 17, a process of covering the nozzle surface 50 with a cap 62 of the maintenance mechanism 60, which will be described later, and then sucking ink from the nozzles 38A using a suction pump 74. The cap cleaning process is a process of cleaning the nozzle surface 50 of the head 38 with the second maintenance liquid sent into the internal spaces 67A, 67B, and 67C (see FIG. 10) of the cap 62 while the nozzle surface 50 is covered with the cap 62. Wiping is a process of wiping the nozzle surface 50 of the head 38 with a sponge wiper (one example of the water-absorbent second wiper) 64 of the maintenance mechanism 60, as illustrated in FIG. 18. The configuration of the maintenance mechanism 60 will be described later.

The wiper cleaning mechanism 80 is for cleaning the rubber wiper (one example of the first wiper) 63 of the maintenance mechanism 60. The maintenance mechanism 60 is moved directly below the wiper cleaning mechanism 80 when the rubber wiper 63 is to be cleaned. The configuration of the wiper cleaning mechanism 80 is described later.

[Head 38]

Figure 4:
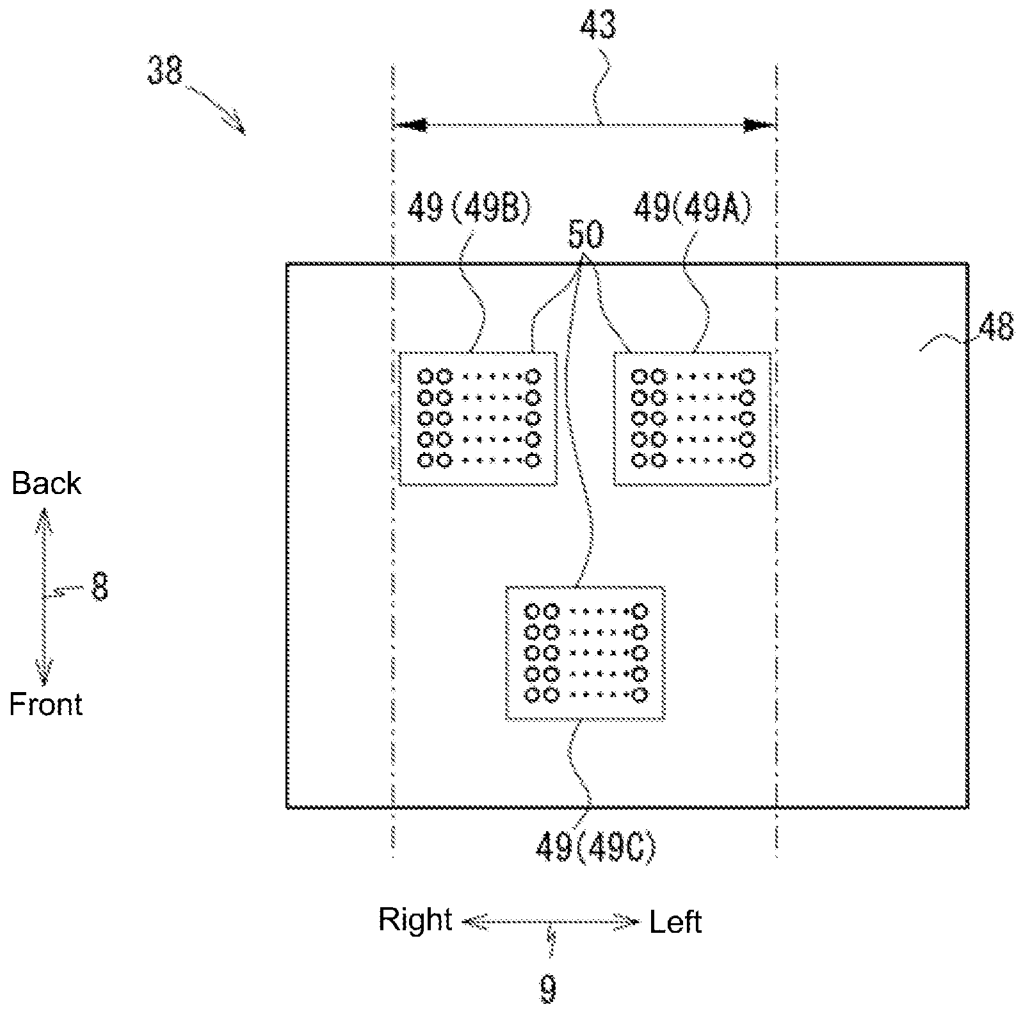
FIG. 4 is a bottom view of the head 38.

As illustrated in FIGS. 2 and 4, the head 38 has a substantially rectangular body shape elongated in the left-right direction 9. The head 38 includes a frame 48 and three ejecting modules 49A, 49B, 49C. Hereinafter, the three ejecting modules 49A, 49B, and 49C are also collectively referred to as ejecting module 49. Note that the number of ejecting modules 49 is not limited to three, and may be, for example, one.

As illustrated in FIGS. 2 and 4, the ejecting module 49 is supported by the frame 48. The lower surface of the ejecting module 49 is exposed downward. The ejecting module 49 is arranged in the transport path 43 in the left-right direction 9.

As illustrated in FIG. 4, the ejecting modules 49A and 49B are provided at the same position in the transport direction 8A. The ejecting modules 49A and 49B are arranged with a space therebetween in the left-right direction 9. The ejecting module 49C is arranged downstream of the ejecting modules 49A and 49B in the transport direction 8A. The ejecting module 49C is provided between the two adjacent ejecting modules 49A and 49B in the left-right direction 9. The left end of the ejecting module 49C is positioned leftward from the right end of the ejecting module 49A. The right end of the ejecting module 49C is positioned right from the left end of the ejecting module 49B. In other words, in the left-right direction 9, the end part of the ejecting module 49C and the end part of the ejecting modules 49A and 49B overlap.

Each ejecting module 49A, 49B, 49C contains a plurality of nozzles 38A. Each nozzle 38A is opened on the nozzle surface 50 of each ejecting module 49A, 49B, 49C. The nozzle surface 50 is a surface extending in the front-to-back direction 8 and the left-right direction 9. As described above, ink is ejected downward from the plurality of nozzles 38A toward the sheet S supported by the transport belt 101 of the first support mechanism 51, and an image is recorded on the sheet S.

Figure 19:
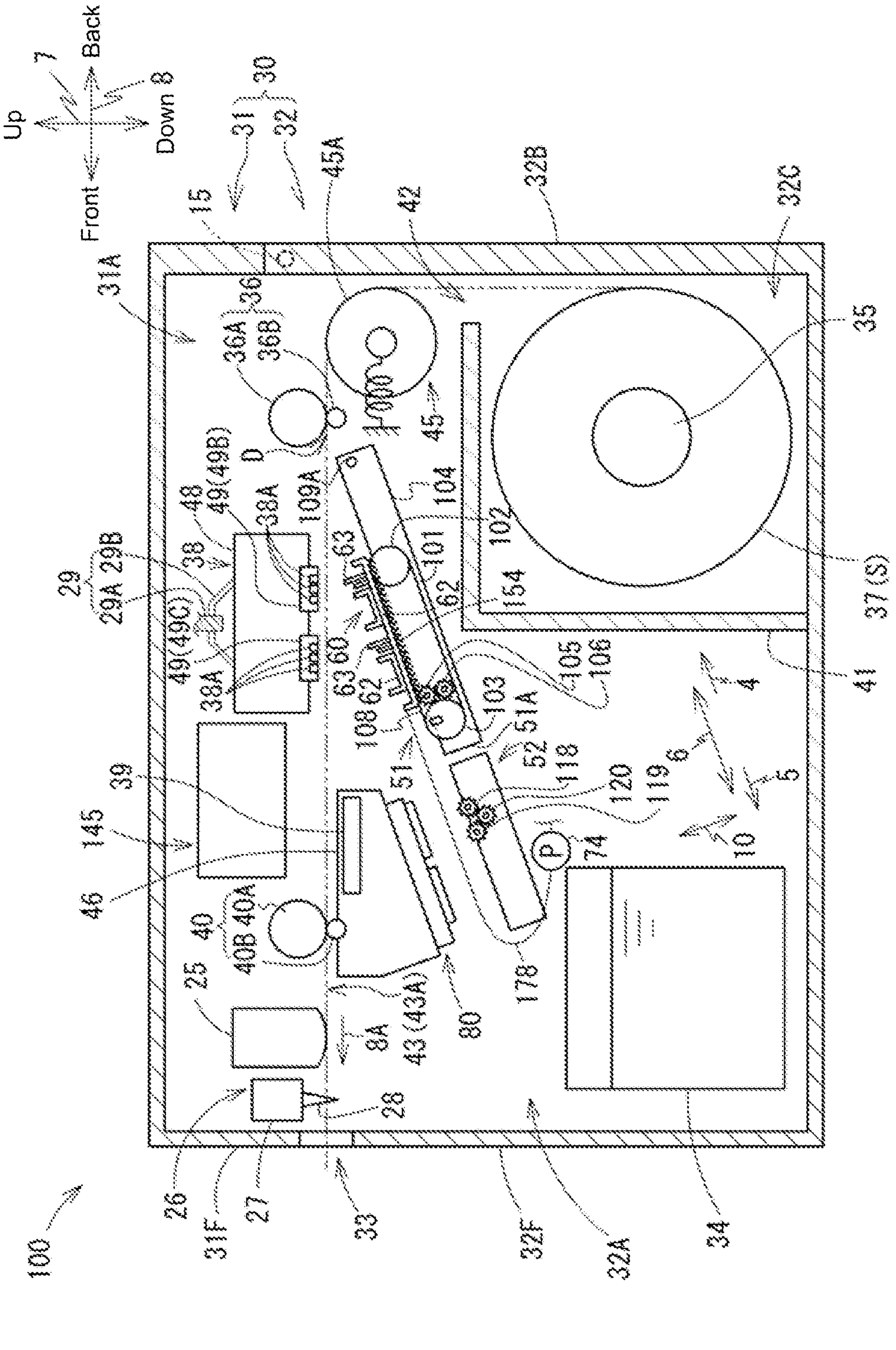
FIG. 19 is a cross-sectional view illustrating the II-II cross section of FIG. 1, indicating a state in which the head 38 is at a recording position, the first support mechanism 51 is at a second orientation, and the maintenance mechanism 60 is at a position supported by the first support mechanism 51.
Figure 20:
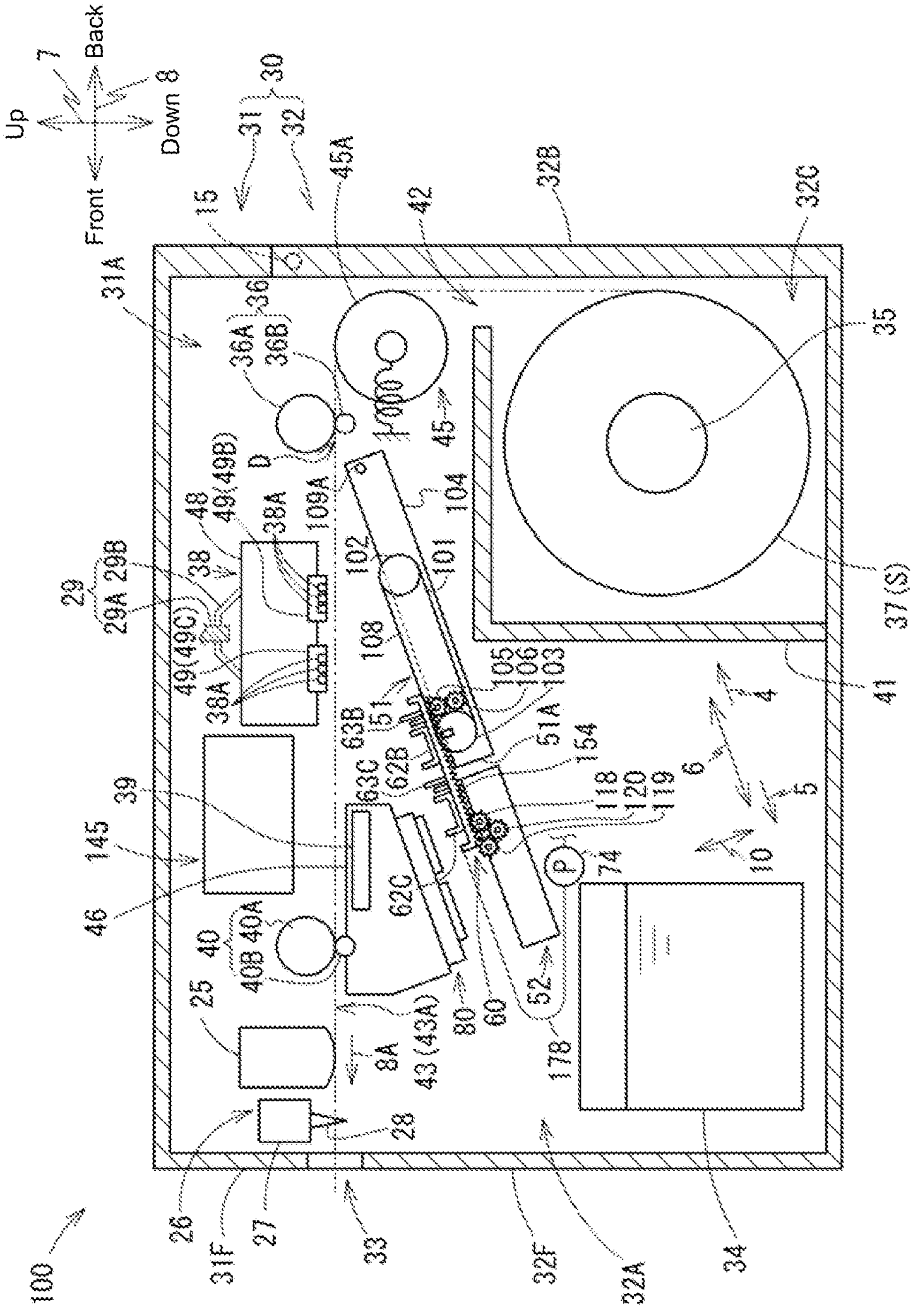
FIG. 20 is a cross-sectional view illustrating the II-II cross section of FIG. 1, indicating a state in which the head 38 is at a recording position, the first support mechanism 51 is at a second orientation, and the maintenance mechanism 60 is at a position between the standby position and the maintenance position.
Figure 21:
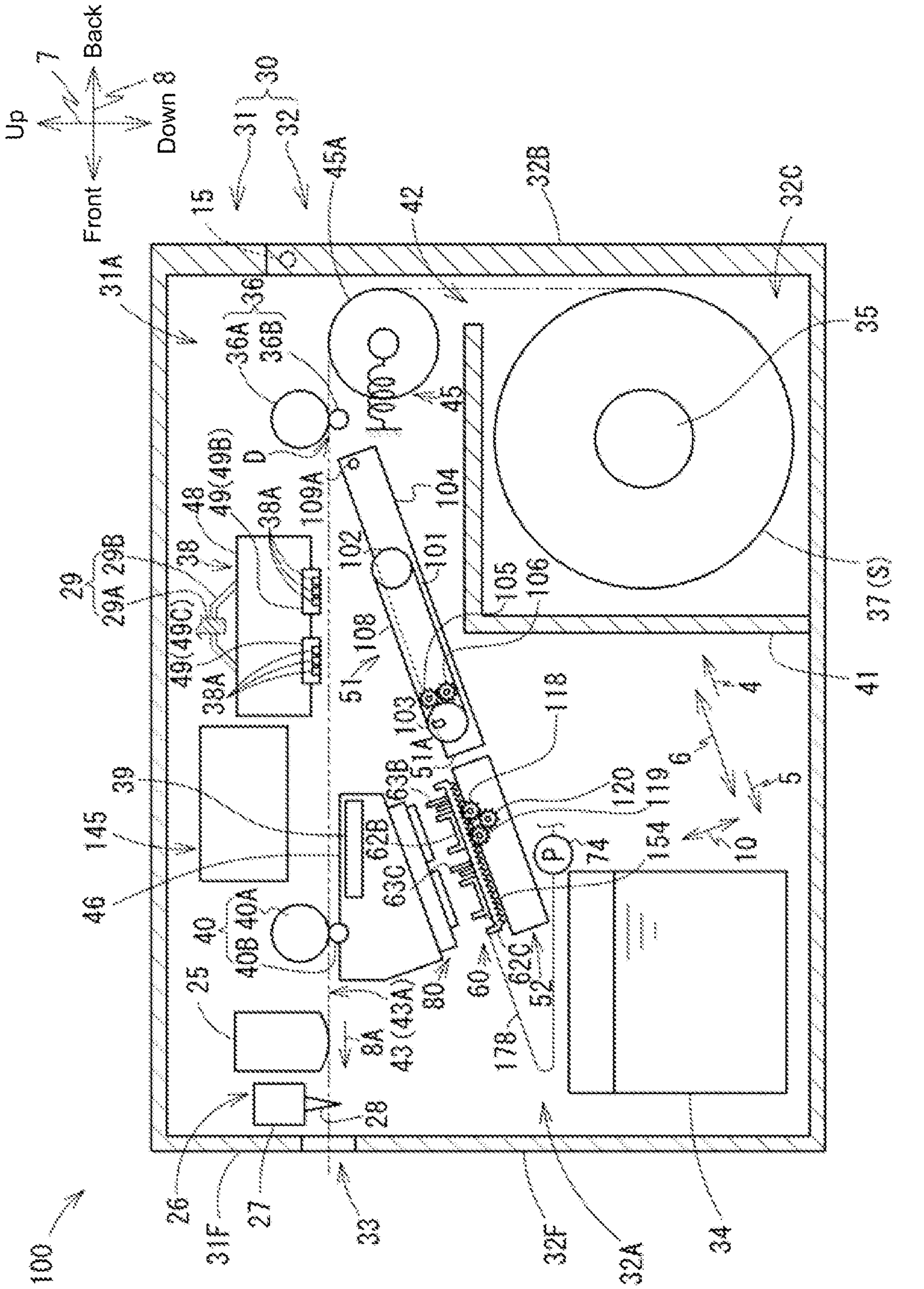
FIG. 21 is a cross-sectional view illustrating the II-II cross section of FIG. 1, indicating a state in which the head 38 is at a recording position, the first support mechanism 51 is at a second orientation, and the maintenance mechanism 60 is at a standby position.

The head 38 is illustrated along the vertical direction 7, and moves to the recording position illustrated in FIGS. 19 to 21, the capped position illustrated in FIG. 17, the wiping position illustrated by the solid lines in FIG. 18, and the uncapped position illustrated by the dashed line in FIG. 18. The recording position is the position of the head 38 when recording an image on the sheet S supported by the transport belt 101. The capped position is the position of the head 38 when the ejecting module 49 is covered with the cap 62 of the maintenance mechanism 60. The capped position is a position above the recording position (a position farther from the first support mechanism 51 than the recording position). The wiping position is the position of the head 38 when the sponge wiper 64 of the maintenance mechanism 60 wipes the nozzle surface 50 of the ejecting module 49. The wiping position is a position higher than the capped position. The uncapped position is the position of the head 38 when the head 38 is completely separated from the maintenance mechanism 60. The uncapped position is a position above the wiping position.

As illustrated in FIG. 2, the head 38 is moved by the ball screw 29. The ball screw 29 has a screw shaft 29A and a nut member 29B. The screw shaft 29A is supported by the lower housing 32 so as to be rotatable about an axis extending in the vertical direction 7. The screw shaft 29A rotates when a driving force is transmitted from a head motor 54 (see FIG. 16). The nut member 29B moves upward by the forward rotation of the screw shaft 29A, and moves downward by the reverse rotation of the screw shaft 29A. Note that the configuration for vertically moving the head 38 is not limited to the configuration using the ball screw 29, and various other known configurations can be adopted.

[First Support Mechanism 51]

Figure 5:
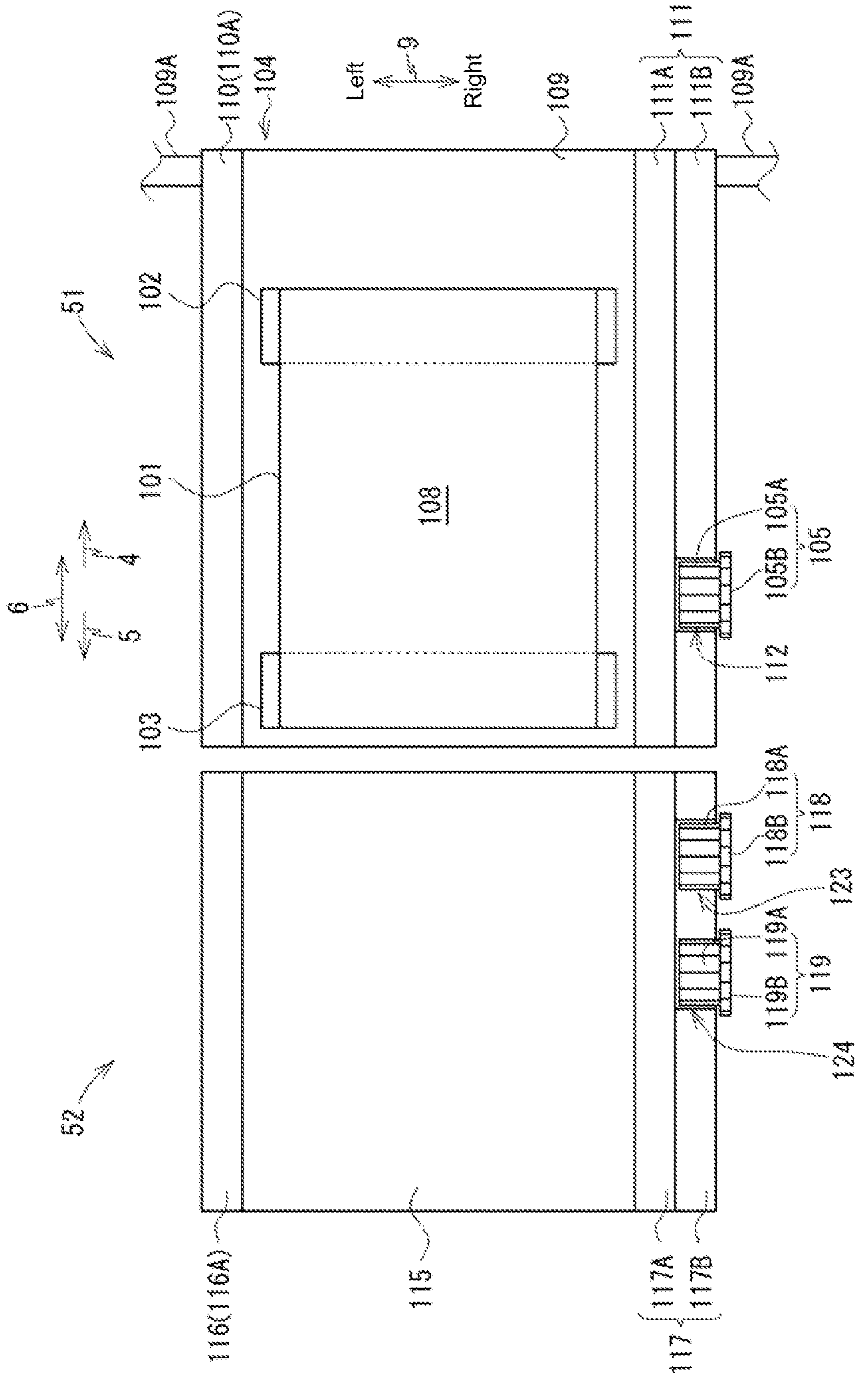
FIG. 5 is a plan view of the first support mechanism 51 and the second support mechanism 52 in the second orientation.
Figure 6:
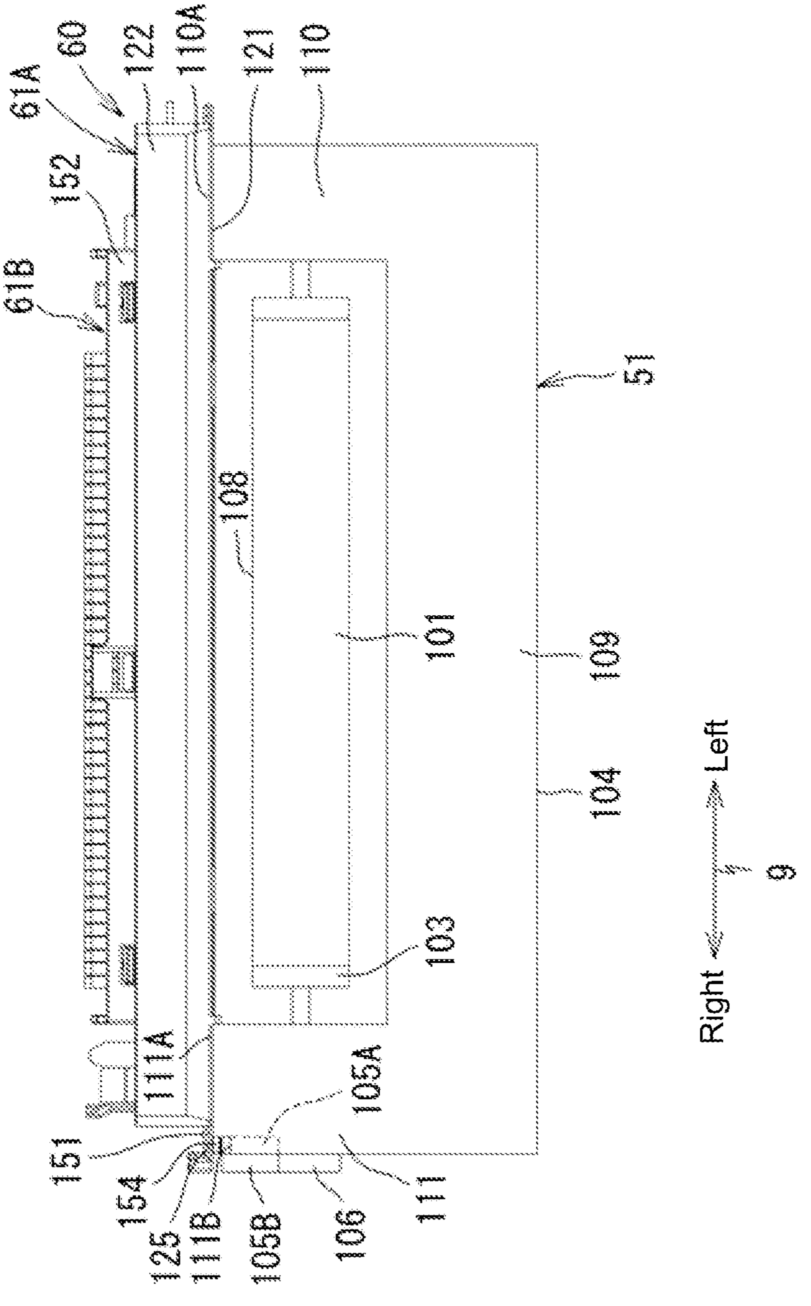
FIG. 6 is a front view of the first support mechanism 51 and maintenance mechanism 60 in the second orientation.

As illustrated in FIGS. 2, 5, and 6, the first support mechanism 51 includes a transport belt 101, a drive roller 102, a driven roller 103, a support member 104, a gear 105, and a gear 106. Note that the teeth of the gears 105 and 106 are omitted in the figures.

The drive roller 102 and the driven roller 103 are rotatably supported by a support member 104. The drive roller 102 and the driven roller 103 are separated from each other in the front-to-back direction 8 (transport direction 8A). The transport belt 101 is an endless belt. A transport belt 101 is stretched over the drive roller 102 and the driven roller 103. The transport belt 101 is arranged in the transport path 43 in the left-right direction 9.

The drive roller 102 is rotated by a driving force provided by the transport motor 53 (see FIG. 16) to rotate the transport belt 101. As the transport belt 101 rotates, the driven roller 103 rotates. The transport belt 101 has a transport surface 108. The transport surface 108 is the upper portion of the outer peripheral surface of the transport belt 101 and extends along the transport direction 8A. The transport surface 108 faces the nozzles 38A of the head 38 with the transport path 43 interposed therebetween. The transport surface 108 applies a transport force to the sheet S while supporting the sheet S transported between the pair of transport rollers 36 and 40 from below. As a result, the transport belt 101 transports the sheet S positioned on the transport path 43 in the transport direction 8A along the transport surface 108.

As illustrated in FIGS. 2 and 5, the support member 104 has a shaft 109 A. The shaft 109A is rotatably supported by the lower housing 32. The shaft 109A extends in the left-right direction 9 (direction perpendicular to the transport direction 8A and parallel to the nozzle surface 50 of the ejecting module 49). The shaft 109A is provided upstream of the drive roller 102 in the transport direction 8A. The shaft 109A is positioned below the transport roller pair 36.

The shaft 109A is rotated by a driving force transmitted from a shaft motor 59 (see FIG. 16). As the shaft 109A rotates, the support member 104 rotates around the shaft 109A. The pivot tip end 51A of the first support mechanism 51 is positioned downstream in the transport direction 8A from the shaft 109A.

The support member 104 has a first orientation parallel to the nozzle surface 50 of the ejecting module 49 (see FIG. 2), and a second orientation where the support member 104 is oblique around the shaft 109A as the center from the first orientation, and a pivot tip end 51A is positioned below the shaft 109, such that the orientation can be altered (see FIG. 19).

As illustrated in FIG. 2, the transport surface 108 of the transport belt 101 extends along the front-to-back direction 8 when the first support mechanism 51 is in the first orientation. As a result, the transport belt 101 can transport the sheet S positioned on the transport path 43 forward to the support part 46.

As illustrated in FIG. 2 and FIG. 19 to FIG. 21, when the first support mechanism 51 is in the second orientation, the transport surface 108 of the transport belt 101 extends along a downward sloping direction 6 toward the front. Note that the sloping direction 6 is perpendicular to the left-right direction 9 and intersects the transport direction 8A.

As illustrated in FIGS. 5 and 6, the support member 104 has a main body 109 and vertical walls 110, 111. Note that in the following description of the support member 104, it is assumed that the first support mechanism 51 is in the second orientation. The main body 109 is a generally a plate-shaped member, and has a shaft 109A. The vertical wall 110 rises upward from the left end part of the main body 109. The vertical wall 111 rises upward from the right end part of the main body 109. The vertical walls 110, 111 extend along a sloping direction 6.

The vertical walls 110, 111 are provided outside the transport path 43 in the left-right direction 9. The vertical walls 110, 111 rotatably support the drive roller 102 and driven roller 103.

Figure 8:
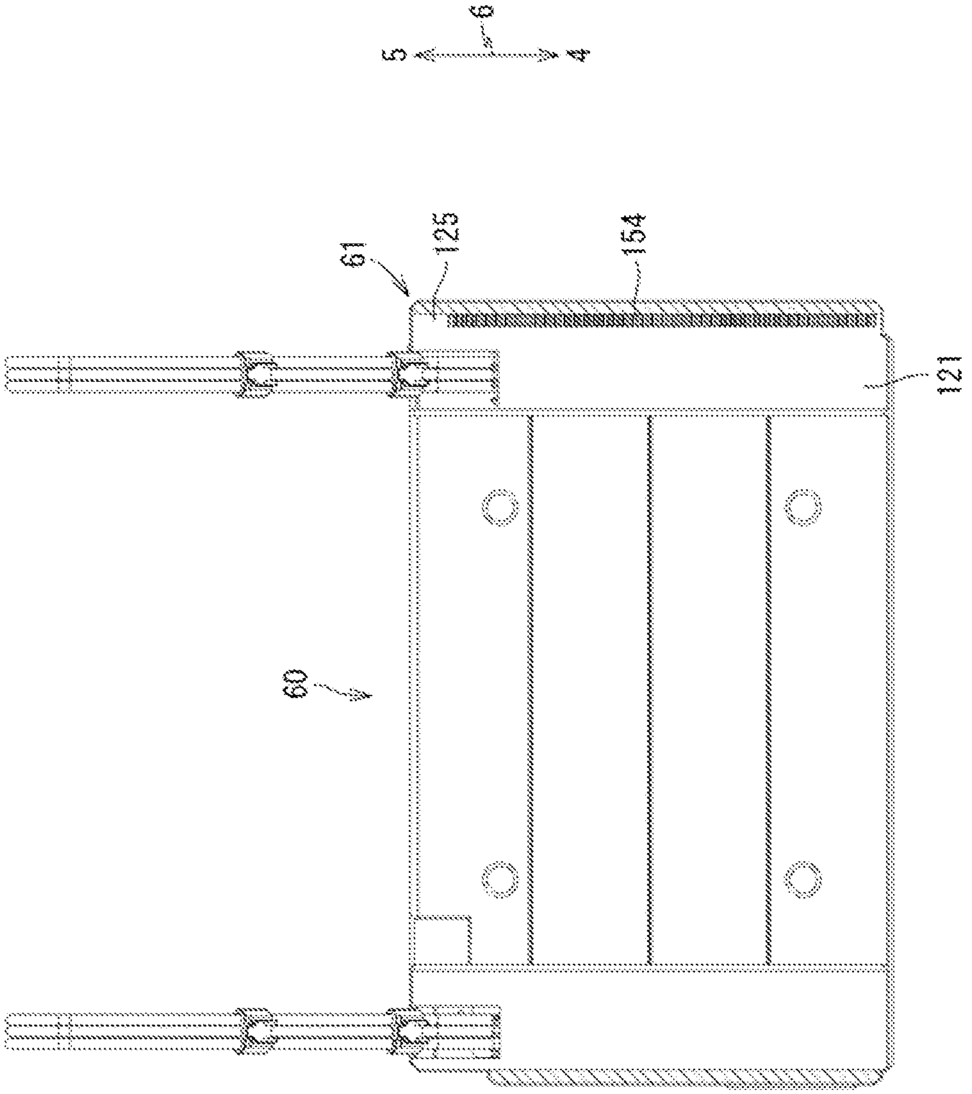
FIG. 8 is a bottom view of the maintenance mechanism 60.

The vertical wall 110 has an upper surface 110A. The vertical wall 111 has a first upper surface 111A and a second upper surface 111B. The second upper surface 111B is in a different position in the left-right direction 9 than the first upper surface 111A. The upper surface 110A and the first upper surface 111A support the maintenance mechanism 60 to slidably support the movement of the maintenance mechanism 60. As illustrated in FIGS. 5 and 8, the second upper surface 111B is in a position that can face the rack 154, described later, in the maintenance mechanism 60. An opening 112 is formed in the second upper surface 111B. A portion of gear 105A protrudes upward from the opening 112. Gear 105A can engage with the rack 154 which is in an opposing position.

As illustrated in FIG. 2 and FIG. 5, gears 105 and 106 are rotatably supported by the support member 104 of first support mechanism 51. The gear 105 includes gears 105A and 105B, aligned along the left-right direction 9. Gear 105A and gear 105B are arranged to be mutually coaxial. Gear 105A rotates in unison with gear 105B. Gear 105B is engaged with gear 106. The gear 106 is connected to the first motor 55 (see FIG. 16) directly or via another gear or the like, and is driven by a driving force from the first motor 55.

[Second Support Mechanism 52]

As illustrated in FIG. 2, the second support mechanism 52 is provided in an overall sloping direction 6 and can be moved in an orthogonal direction 10 by a ball screw 160. The ball screw 160 has a screw shaft 161 and a nut member 162. Note that the ball screw 160 that drives the second support mechanism 52 is illustrated only in FIG. 2, and is omitted in the other drawings.

As illustrated in FIGS. 2 and 5, the second support mechanism 52 includes the main body 115, vertical walls 116, 117, and gears 118, 119, 120. Note that the teeth of the gears 118, 119, 120 are omitted in the figures.

The main body 115 is a generally a plate-shaped member. The screw shaft 161 of the ball screw 160 is fixed to the main body 115, and is screwed to a nut member 162 fixed to a lower housing 32. The screw shaft 161 rotates when a driving force is transmitted from vertical drive motor 163 (see FIG. 16). Thereby, the main body 115 can move in the orthogonal direction 10. Note that the configuration for vertically moving the head 38 is not limited to the configuration using the ball screw 160, and various other known configurations can be adopted.

The vertical wall 116 rises upward from the left end part of the main body 115. The vertical wall 117 rises upward from the right end part of the main body 115. The vertical walls 116, 117 extend along a sloping direction 6.

The vertical wall 116 is in the same position in the left-right direction 9 as the vertical wall 110 of the first support mechanism 51. The vertical wall 117 is in the same position in the left-right direction 9 as the vertical wall 111 of the first support mechanism 51.

The vertical wall 116 has an upper surface 116A. The vertical wall 117 has a first upper surface 117A and a second upper surface 117B. The second upper surface 117B is in a different position in the left-right direction 9 than the first upper surface 117A.

When the first support mechanism 51 is in the second orientation, the first upper surface 117A is aligned with the first upper surface 111A of the vertical wall 111 of the first support mechanism 51 along the sloping direction 6, and is on the same plane as the first upper surface 111A. In other words, the first upper surface 117A and the first upper surface 111A are aligned linearly. When the first support mechanism 51 is in the second orientation, the second upper surface 117B is aligned with the second upper surface 111B of the vertical wall 111 of the first support mechanism 51 along the sloping direction 6, and is on the same plane as the second upper surface 111B. In other words, the second upper surface 117B and the second upper surface 111B are aligned linearly.

The upper surface 116A and the first upper surface 117A support the maintenance mechanism 60 to slidably support the movement of the maintenance mechanism 60. The second upper surface 117B is at a position that can face the rack 154 of the maintenance mechanism 60. As illustrated in FIG. 5, the second upper surface 117B has openings 123, 124. The opening 124 is positioned forward of the opening 123. A portion of the gear 118 protrudes upward from the opening 123. A portion of the gear 119 protrudes upward from the opening 124. The gears 118, 119 can engage with the rack 154 which is in an opposing position.

As illustrated in FIG. 2 and FIG. 5, gears 118, 119, 120 are rotatably supported by the main body 115 of second support mechanism 52. The gear 118 includes gears 118A and 118B, aligned along the left-right direction 9. Gear 118A and gear 118B are arranged to be mutually coaxial. Gear 118A rotates in unison with gear 118B. The gear 119 includes gears 119A and 119B, aligned along the left-right direction 9. Gear 119A and gear 119B are arranged to be mutually coaxial. Gear 119A rotates in unison with gear 119B. Gear 120 engages with gears 118B and 119B. Therefore, when gear 120 rotates, gears 118 and 119 rotate in the same direction. The gear 120 is connected to the second motor 56 (see FIG. 16) directly or via another gear or the like, and is driven by a driving force from the second motor 56.

[Maintenance Mechanism 60]

Figure 7:
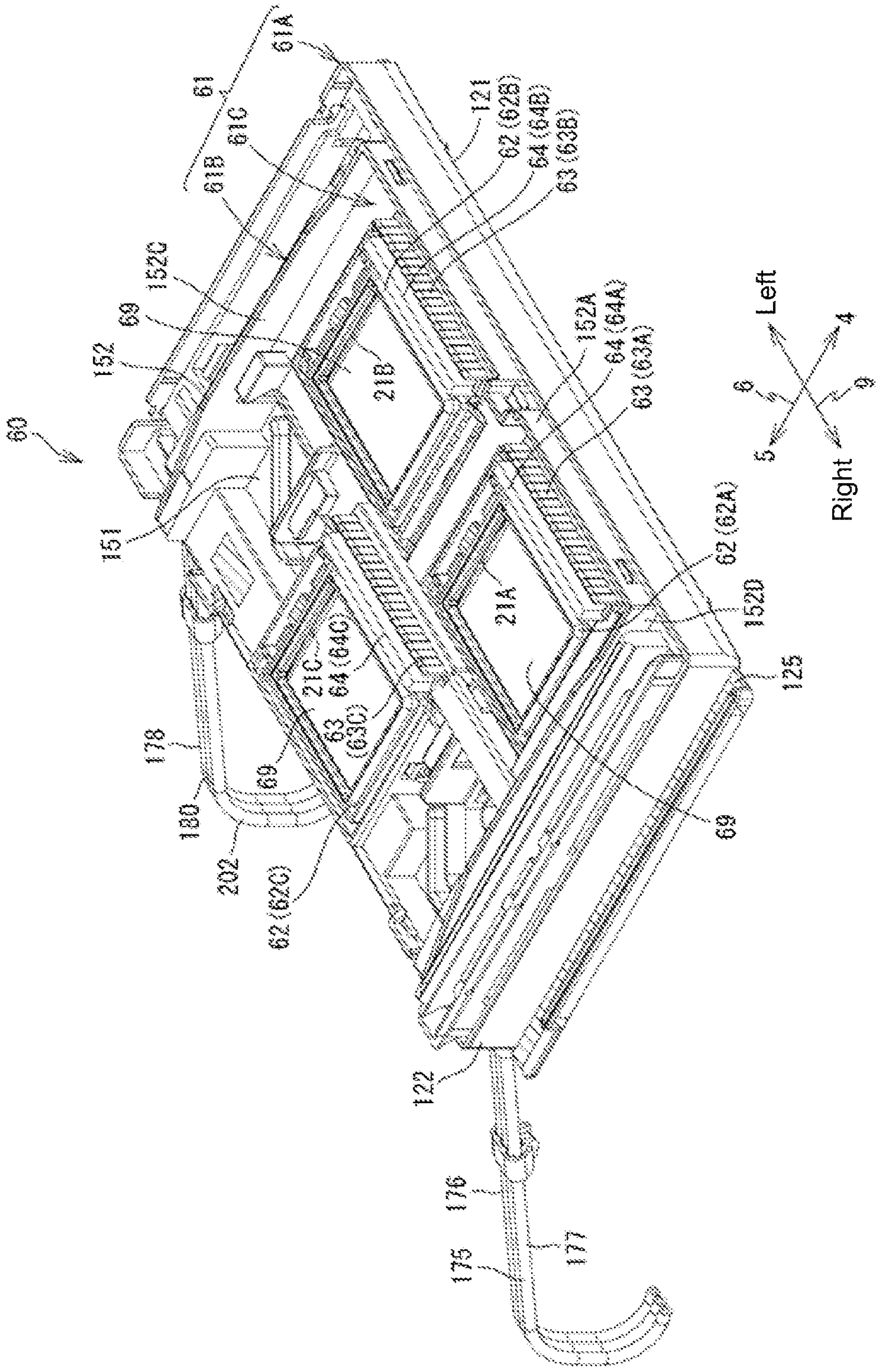
FIG. 7 is a perspective view of a maintenance mechanism 60.

As illustrated in FIG. 6 and FIG. 7, the maintenance mechanism 60 includes a support base 61, a sponge wiper 64 (an example of a second wiper), a rubber wiper 63 (an example of a first wiper), and a cap 62. Note that in the following description of the maintenance mechanism 60, it is assumed that the maintenance mechanism 60 is supported by the first support mechanism 51 in the second orientation and the second support mechanism 52.

[Support Base 61]

The support base 61 has a base 61A, a main body 61B placed on the base 61A, and a wiper holder 61C that holds the sponge wiper 64 and the rubber wiper 63 on the main body 61B. The base 61A has a box shape with an open top. The base 61A includes a first bottom plate 121, a first edge plate 122 standing vertical from the peripheral edge of the first bottom plate 121, an extending piece 125, and a rack 154 (see FIG. 8).

The first bottom plate 121 has a flat plate shape extending in the sloping direction 6 and the left-right direction 9. The upper and lower surfaces of the first bottom plate 121 are formed in a rectangular shape that is longer in the left-right direction 9 than the sloping direction 6. The lower surface of the first bottom plate 121 can contact the upper surface 110A of the vertical wall 110 of the first support mechanism 51 from above. The lower surface of the first bottom plate 121 can contact the first upper surface 111A of the vertical wall 111 from above. Thereby, the maintenance mechanism 60 can be supported by the first support mechanism 51. The lower surface of the first bottom plate 121 can contact the upper surface 116A of the vertical wall 116 of the second support mechanism 52 from above. The lower surface of the first bottom plate 121 can contact the first upper surface 117A of the vertical wall 117 of the second support mechanism 52 from above. Thereby, the maintenance mechanism 60 can be supported by the second support mechanism 52.

The first edge plate 122 has a rectangular frame shape in plan view. The extending piece 125 extends rightward from the lower end part of the right wall of the first edge plate 122. The extending piece 125 extends from one end of the right wall of the first edge plate 122 in the sloping direction 6 to the other end.

The rack 154 is formed on the lower surface of the extending piece 125. The rack 154 extends from one end part of the extending piece 125 in the sloping direction 6 to the vicinity of the other end part, as illustrated in FIG. 8. The rack 154 can vertically face the second upper surface 111B of the vertical wall 111 of the first support mechanism 51 (see FIG. 6).

The rack 154 can engage with the gear 105A protruding from the opening 112 of the second upper surface 111B. The maintenance mechanism 60 slides along the upper surface 110A and the first upper surface 111A with regard to the first support mechanism 51 by rotating the gear 105A in a condition where the rack 154 is engaged with the gear 105A. In other words, the movement of the maintenance mechanism 60 is guided by the upper surface 110A and the first upper surface 111A of the first support mechanism 51.

The rack 154 can vertically face the second upper surface 117B of the vertical wall 117 of the second support mechanism 52. The rack 154 can engage with the gear 118A that protrudes from the opening 123 on the second upper surface 117B and the gear 119A that protrudes from the opening 124 of the second upper surface 117B. The maintenance mechanism 60 slides along the upper surface 116A and the first upper surface 117A with regard to the second support mechanism 52 by rotating the gear 105A in a condition where the rack 154 is engaged with at least one of the gear 118A and the gear 119A. In other words, the movement of the maintenance mechanism 60 is guided by the upper surface 116A and the first upper surface 111A of the second support mechanism 52.

Figure 22:
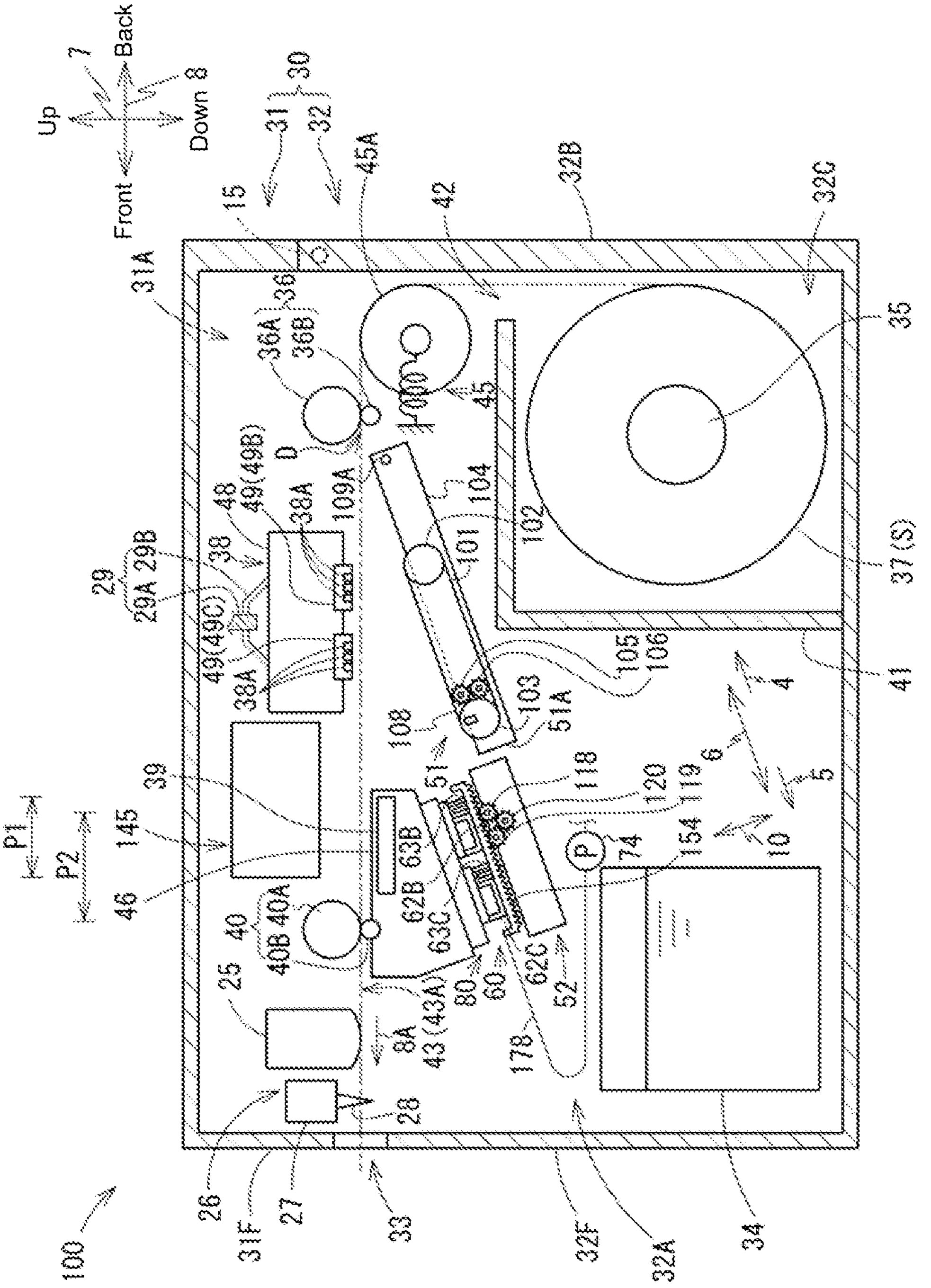
FIG. 22 is a cross-sectional view illustrating the II-II cross section of FIG. 1, indicating a state in which the head 38 is at a recording position, the first support mechanism 51 is at a second orientation, and the maintenance mechanism 60 is at a retracted position.
Figure 23:
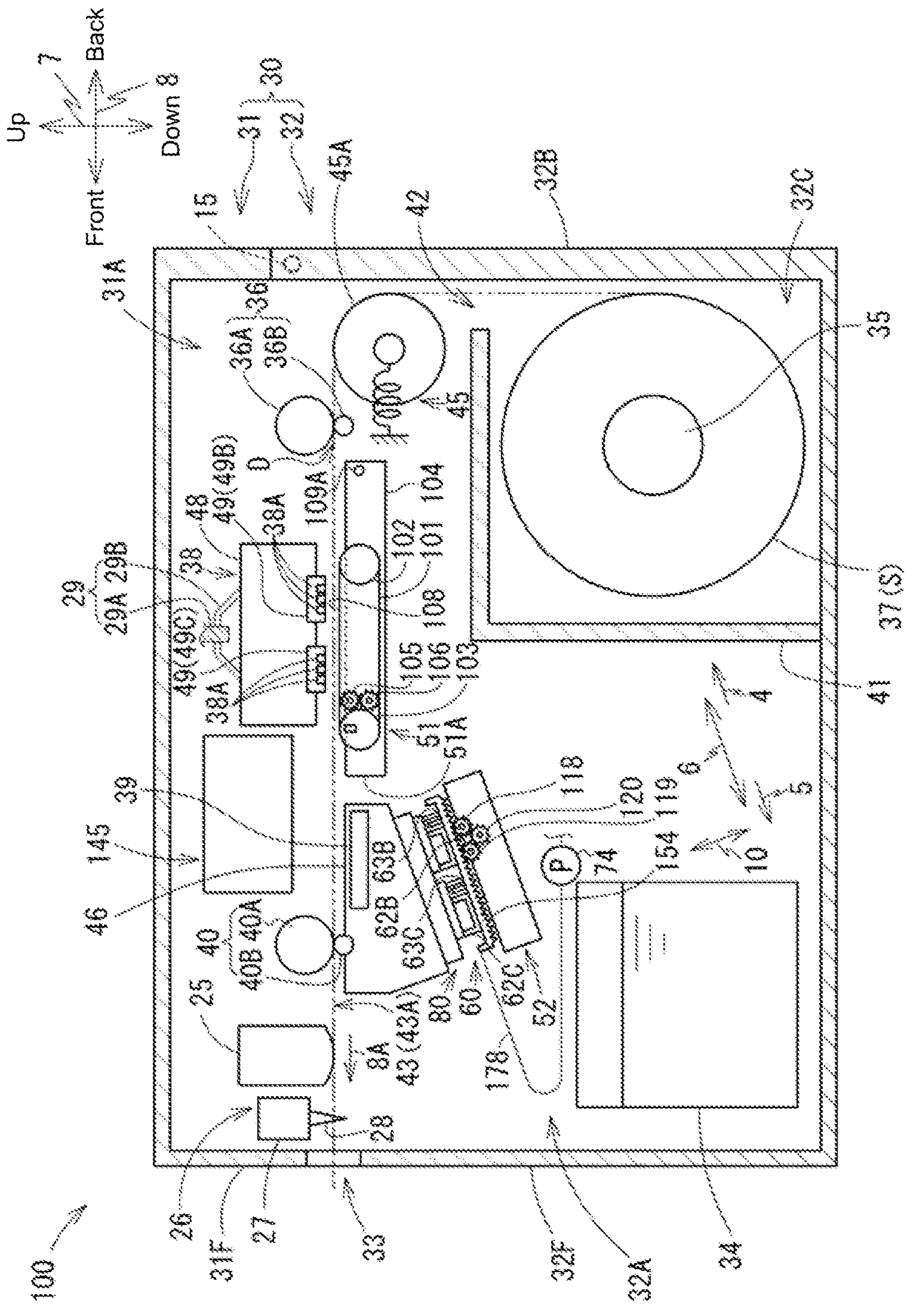
FIG. 23 is a cross-sectional view illustrating the II-II cross section of FIG. 1, indicating a state in which the head 38 is at a recording position, the first support mechanism 51 is at a first orientation, and the maintenance mechanism 60 is at a retracted position.

As a result, the maintenance mechanism 60 can move to a standby position as illustrated in FIG. 2 and FIG. 21, a retracted position as illustrated in FIG. 22 and FIG. 23 (an example of the retracted position), a maintenance position as illustrated in FIG. 17 (an example of a covered position), and a wiping position as illustrated in FIG. 18, as will be described later. The maintenance mechanism 60 at the maintenance position and at the wiping position faces the nozzle surface 50 of the ejecting module 49 of the head 38 in the vertical direction 7. The maintenance mechanism 60 at the standby position and at the retracted position is separated from the nozzle surface 50.

As illustrated in FIG. 7, the main body 61B has a substantially box-like shape with an open top. The main body 61B is fixed to the base 61A. The main body 61B includes a second bottom plate 151, a second edge plate 152 standing vertical from the second bottom plate 151, and a liquid channel 153 for circulating the second maintenance liquid stored in the cleaning liquid tank 76.

Figure 9:
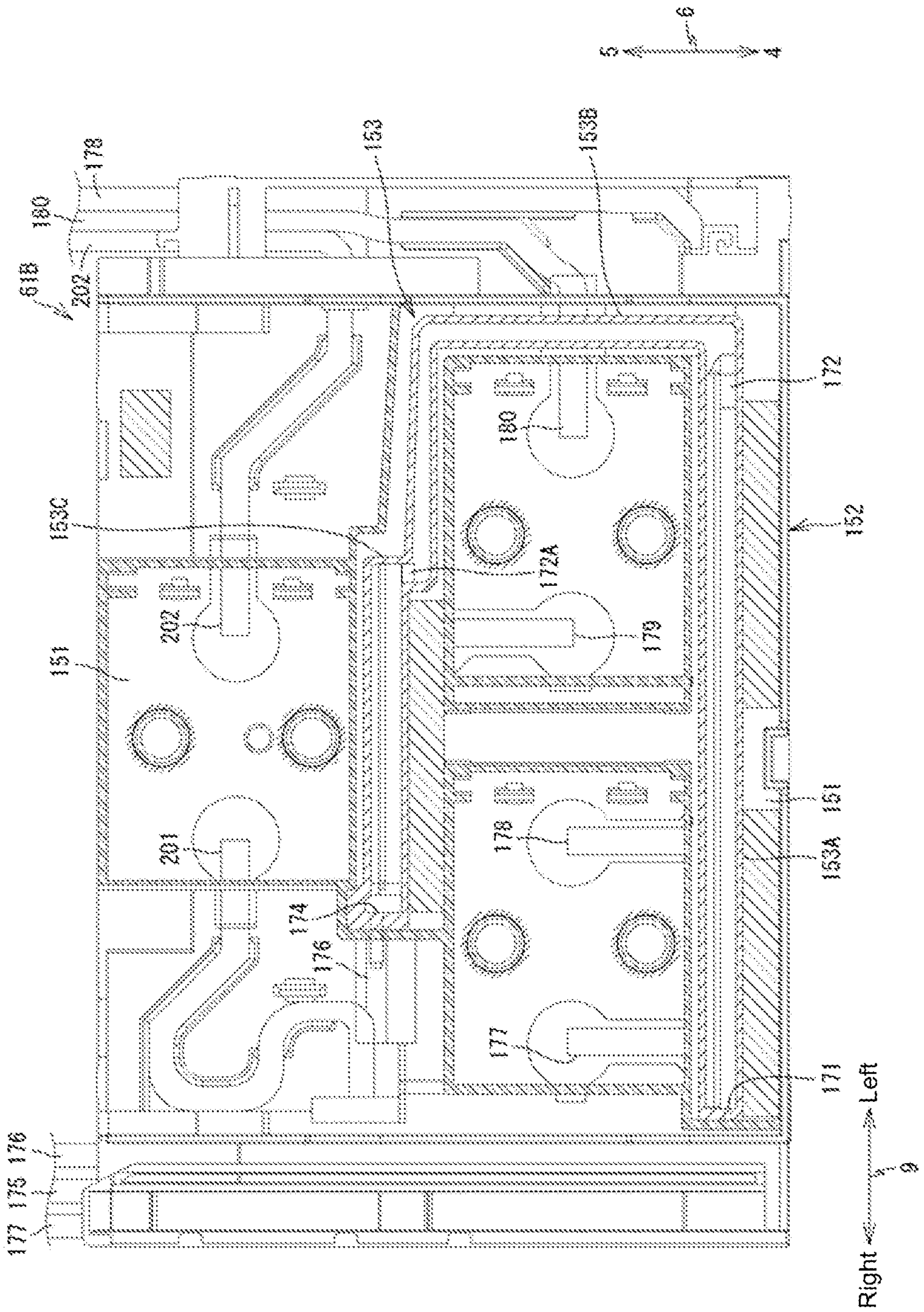
FIG. 9 is a cross-sectional view of the liquid channel 153 of the support base 61 cut along a plane parallel to the flow direction of the liquid channel 153.

As illustrated in FIGS. 7 and 9, the second bottom plate 151 has a flat plate shape extending in the sloping direction 6 and the left-right direction 9. The upper and lower surfaces of the second bottom plate 151 are formed in a rectangular shape that is longer in the left-right direction than the sloping direction 6. The second edge plate 152 has a rectangular frame shape in plan view.

As illustrated in FIG. 9, the liquid channel 153 is formed on the upper surface of the second bottom plate 151. The liquid channel 153 is a recessed groove that is recessed downward from the upper surface of the second bottom plate 151 and opens upward. The liquid channel 153 has a continuous U-shape that extends in the left-right direction 9 and turns back to make a U-turn in plan view. The liquid channel 153 extends to connect in series the sponge wipers 64A, 64B, and 64C arranged in a concave groove. The liquid channel 153 has a first channel 153A, an intermediate channel 153B, and a second channel 153C.

The first channel 153A is positioned upstream in the liquid channel 153 in the second maintenance liquid flow direction. The first channel 153A is a portion that extends in the left-right direction 9 on the front side of the main body 61B.

An intermediate channel 153B is positioned downstream of the first channel 153A in the second maintenance liquid flow direction. The intermediate channel 153B extends in the forward sloping direction 5 from the downstream end of the first channel 153A to a middle portion in the sloping direction 6 of the main body 61B.

The second channel 153C is positioned downstream in the liquid channel 153 in the second maintenance liquid flow direction. The second channel 153C extends rightward from the downstream end of the intermediate channel 153B.

As illustrated in FIG. 9, an inflow port 171 through which the second maintenance liquid flows into the first channel 153A is opened in the inner wall surface of the groove at the upstream end of the first channel 153A. One end of a first supply tube 175 is connected to the inflow port 171. The other end of the first supply tube 175 extends to the outside of the first support mechanism 51, is connected to the cleaning liquid tank 76, and opens at a position lower than the water surface of the second maintenance liquid stored in the cleaning liquid tank 76.

An outflow port 174 through which the second maintenance liquid flows out is opened in the inner wall surface at the downstream end of the second channel 153C. One end of a return tube 176 is connected to the outflow port 174. The other end of the return tube 176 extends to the outside of the first support mechanism 51, is connected to the cleaning liquid tank 76, and opens at a position higher than the water surface of the second maintenance liquid stored in the cleaning liquid tank 76. A return pump 75 is provided on the return tube 176 (see FIG. 2). Driving of the return pump 75 is controlled by the controller 130.

As illustrated in FIG. 7, the wiper holder 61C has a sponge wiper 64 and a rubber wiper 63. The sponge wiper 64 and the rubber wiper 63 are supported on the main body 61B by a wiper holder 61C.

[Sponge Wiper 64]

The sponge wiper 64 is made of sponge. In the present embodiment, three sponge wipers 64 (64A, 64B, 64C) are provided. Hereinafter, the three sponge wipers 64A, 64B, and 64C are also collectively referred to as the sponge wiper 64. The sponge wiper 64 is formed in the shape of a rectangular body whose length in the left-right direction 9 is longer than the length in the sloping direction 6 and the vertical direction 7. The length of the sponge wiper 64 in the vertical direction 7 is longer than the length in the sloping direction 6.

The sponge wiper 64A and sponge wiper 64B are arranged in first channel 153A of the liquid channel 153. The sponge wiper 64A is arranged upstream of the sponge wiper 64B. The sponge wiper 64C is arranged in the second channel 153C of the liquid channel 153.

The sponge wiper 64A, sponge wiper 64B, and sponge wiper 64C respectively correspond to ejecting module 49A, ejecting module 49B, and ejecting module 49C in the vertical direction 7. The sponge wiper 64A and sponge wiper 64B are positioned apart from each other in the left-right direction 9. The sponge wiper 64C is positioned spaced in a forward sloping direction 5 from the sponge wipers 64A and 64B. The sponge wiper 64C is positioned in the middle between the sponge wiper 64A and the sponge wiper 64B in the left-right direction 9.

The sponge wiper 64A corresponds to the ejecting module 49A, and can face the ejecting module 49A in the vertical direction 7. As illustrated in FIGS. 7 and 9, the sponge wiper 64A is arranged on the right side of the center in the left-right direction 9 of the first channel 153A.

[Rubber Wiper 63]

The rubber wiper 63 is made of rubber. In the present embodiment, three rubber wipers 63 (63A, 63B, 63C) are provided. Hereinafter, the three rubber wipers 63A, 63B, and 63C are also collectively referred to as the rubber wiper 63.

The rubber wiper 63 is formed in a flat plate shape extending in the vertical direction 7 and the left-right direction 9. The length of the rubber wiper 63 in the sloping direction 6 is shorter than the length of the sponge wiper 64 in the sloping direction 6. As a result, the rubber wiper 63 is easily bent when coming into contact with the nozzle surface 50 of the ejecting module 49 during the wiping process. The length of the rubber wiper 63 in the left-right direction 9 is slightly longer than the length of the sponge wiper 64 in the left-right direction 9. The length of the rubber wiper 63 from the support base 61 is longer than the length of the sponge wiper 64 from the support base 61. The rubber wiper 63 is positioned outside in the left-right direction 9 relative to both ends of the sponge wiper 64 in the left-right direction 9. The upper end part of the rubber wiper 63 is tapered. This facilitates the upper end part of the rubber wiper 63 coming into contact with the nozzle surface 50 of the ejecting module 49 during the wiping process.

Rubber wiper 63A and rubber wiper 63B are arranged outside of the liquid channel 153. The rubber wiper 63A, rubber wiper 63B, and rubber wiper 63C respectively correspond to ejecting module 49A, ejecting module 49B, and ejecting module 49C in vertical direction 7. The rubber wiper 63A, the rubber wiper 63B, and the rubber wiper 63C are arranged on the support base 61 at intervals in a rearward sloping direction 4 from the sponge wiper 64A, the sponge wiper 64B, and the sponge wiper 64C, respectively.

[Cap 62]

As illustrated in FIG. 7, the cap 62 is supported by the support base 61. A plurality of caps 62 are provided. In the present embodiment, the cap 62 is composed of three caps 62A, 62B, 62C. Hereinafter, the three caps 62A, 62B, and 62C are also collectively referred to as the cap 62.

The cap 62 is made of an elastic material such as rubber or silicon. The cap 62 has a box shape with an open top.

The caps 62A, 62B, and 62C can face the ejecting module 49A, the ejecting module 49B, and the ejecting module 49C in the vertical direction 7, respectively. Cap 62A, cap 62B and cap 62C are spaced in the forward sloping direction 5 from sponge wiper 64A, sponge wiper 64B and sponge wiper 64C, respectively. Lips 66A, 66B, and 66C of the caps 62A, 62B, and 62C abut against the nozzle surface 50 to seal internal spaces 67A, 67B, and 67C when the maintenance mechanism 60 is positioned at the maintenance position. The caps 62A, 62B and 62C respectively have cap channels 68A, 68B and 68C that facilitate communication between the internal spaces 67A, 67B and 67C and the outside. The cap channels 68A, 68B, 68C are composed of the supply channels 20A, 20B, 20C through which the second maintenance liquid flows into the internal spaces 67A, 67B, 67C of the cap 62, and the discharge channels 21A, 21B, and 21C through which the second maintenance liquid flows out from the internal spaces 67A, 67B, 67C of the caps 62A, 62B, 62C.

Hereinafter, the three lips 66A, 66B, and 66C will also be collectively referred to as lip 66. Furthermore, the internal spaces 67A, 67B, 67C, the cap channels 68A, 68B, 68C, the supply channels 20A, 20B, 20C, and the discharge channels 21A, 21B, 21C are also referred to as internal spaces 67, cap channels 68, supply channels 20, and discharge channels 21, respectively.

Figure 10:
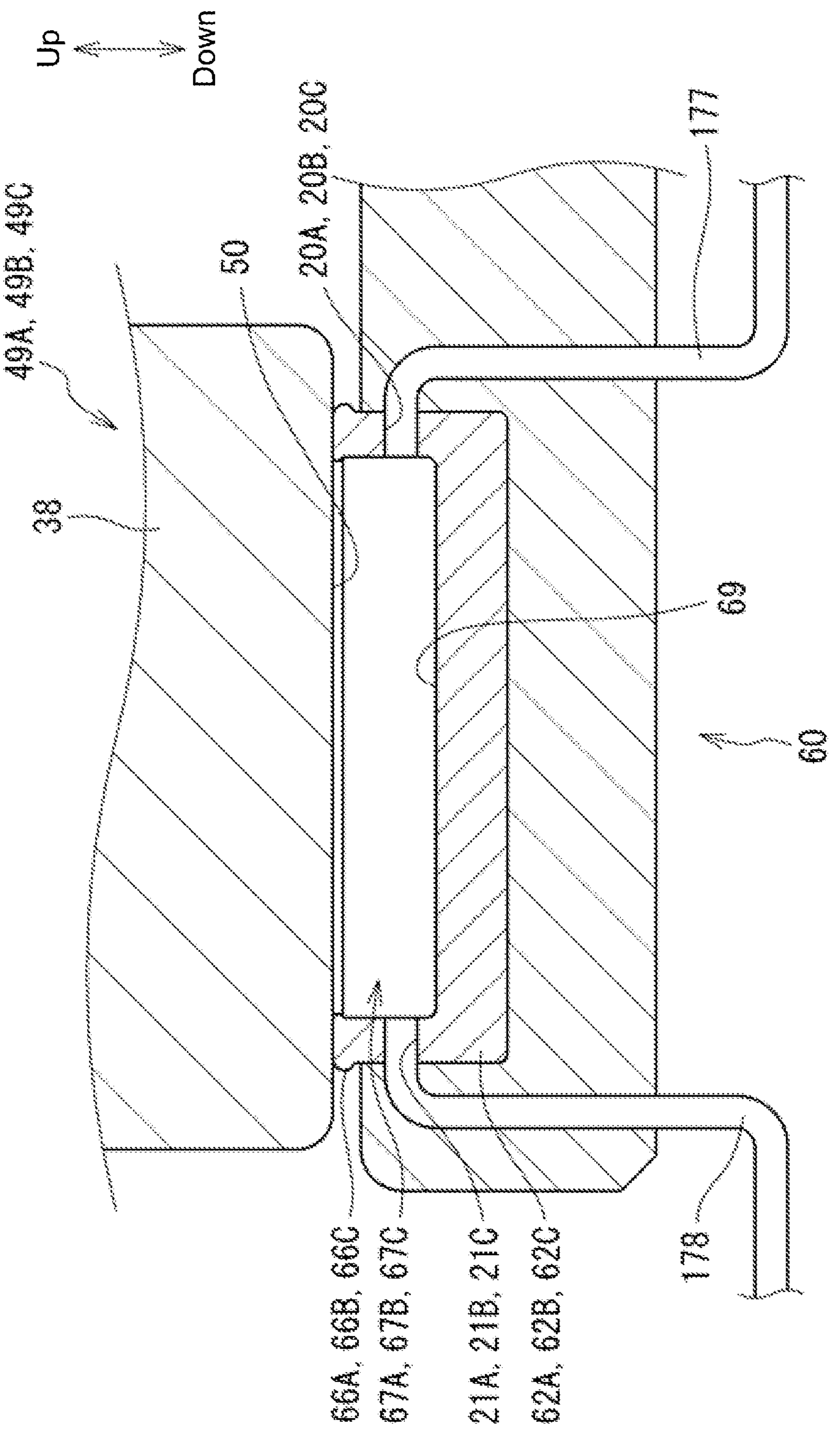
FIG. 10 is a cross-sectional view of caps 62A, 62B, 62C in a maintenance position.

As illustrated in FIG. 10, the cap 62A corresponds to the ejecting module 49A and can face the ejecting module 49A in the vertical direction 7. The cap 62A is spaced in the forward sloping direction 5 from the sponge wiper 64A. The bottom plate 69 of the cap 62A is formed with a supply channel 20A through which the second maintenance liquid flows into the cap 62A and a discharge channel 21A through which the second maintenance liquid flows out from the cap 62A. One end of a second supply tube 177 is connected to the supply channel 20A of the cap 62A. The other end of the second supply tube 177 extends outside the maintenance mechanism 60 and is connected to the cleaning liquid tank 76 (see FIG. 2). One end of a first waste liquid tube 178 is connected to the discharge channel 21A. The other end of the first waste liquid tube 178 extends to outside of the maintenance mechanism 60 and is connected to the waste liquid tank 77 (see FIG. 2).

The cap 62B corresponds to the ejecting module 49B and can face the ejecting module 49B in the vertical direction 7. The cap 62B is spaced in the forward sloping direction 5 from the sponge wiper 64B. The bottom plate 69 of the cap 62B is formed with a supply channel 20B through which the second maintenance liquid flows into the cap 62B and a discharge channel 21B through which the second maintenance liquid flows out from the cap 62B. One end of a third supply tube 179 branched from the second supply tube 177 is connected to the supply channel 20B. One end of the second waste liquid tube 180 is connected to the discharge channel 21B. The other end of the second waste liquid tube 180 merges with the first waste liquid tube 178 outside the maintenance mechanism 60.

The cap 62C corresponds to the ejecting module 49C and can face the ejecting module 49C in the vertical direction 7. The cap 62C is spaced in the forward sloping direction 5 from the sponge wiper 64C. The bottom plate 69 of the cap 62C is formed with a supply channel 20C through which the second maintenance liquid flows into the cap 62C and a discharge channel 21C through which the second maintenance liquid flows out from the cap 62C. One end of a fourth supply tube 201 branched from the second supply tube 177 is connected to the supply channel 20C. One end of the third waste liquid tube 202 is connected to the discharge channel 21C. The other end of the third waste liquid tube 202 merges with the first waste liquid tube 178 outside the maintenance mechanism 60.

A cap cleaning valve 72 (see FIG. 16) is provided on the upstream side of the branch point for the third supply tube 179 and the fourth supply tube 201 in the second supply tube 177. The opening and closing of the cap cleaning valve 72 is controlled by the controller 130.

The second waste liquid tube 180 and the third waste liquid tube 202 in the first waste liquid tube 178 are both provided with a suction pump 74 (see FIG. 2) on the upstream side of the junction. The three suction pumps 74 are driven by one suction pump motor 58 (see FIG. 16).

The total Ta of the volume of the supply channel 20A, the volume of the discharge channel 21A, the volume upstream of the suction pump 74 in the first waste liquid tube 178, and the volume of the internal space of the cap 62A is equivalent to the total Tb of the volume of the supply channel 20B, the volume of the discharge channel 21B, the volume upstream of the suction pump 74 in the second waste liquid tube 180, and the volume of the internal space of the cap 62B, and equivalent to the total Tc of the volume of the supply channel 20C, the volume of the discharge channel 21C, the volume upstream of the suction pump 74 in the third waste liquid tube 202, and the volume of the internal space of the cap 62C (total Ta=total Tb=total Tc).

[Wiper Cleaning Mechanism 80]

Figure 14:
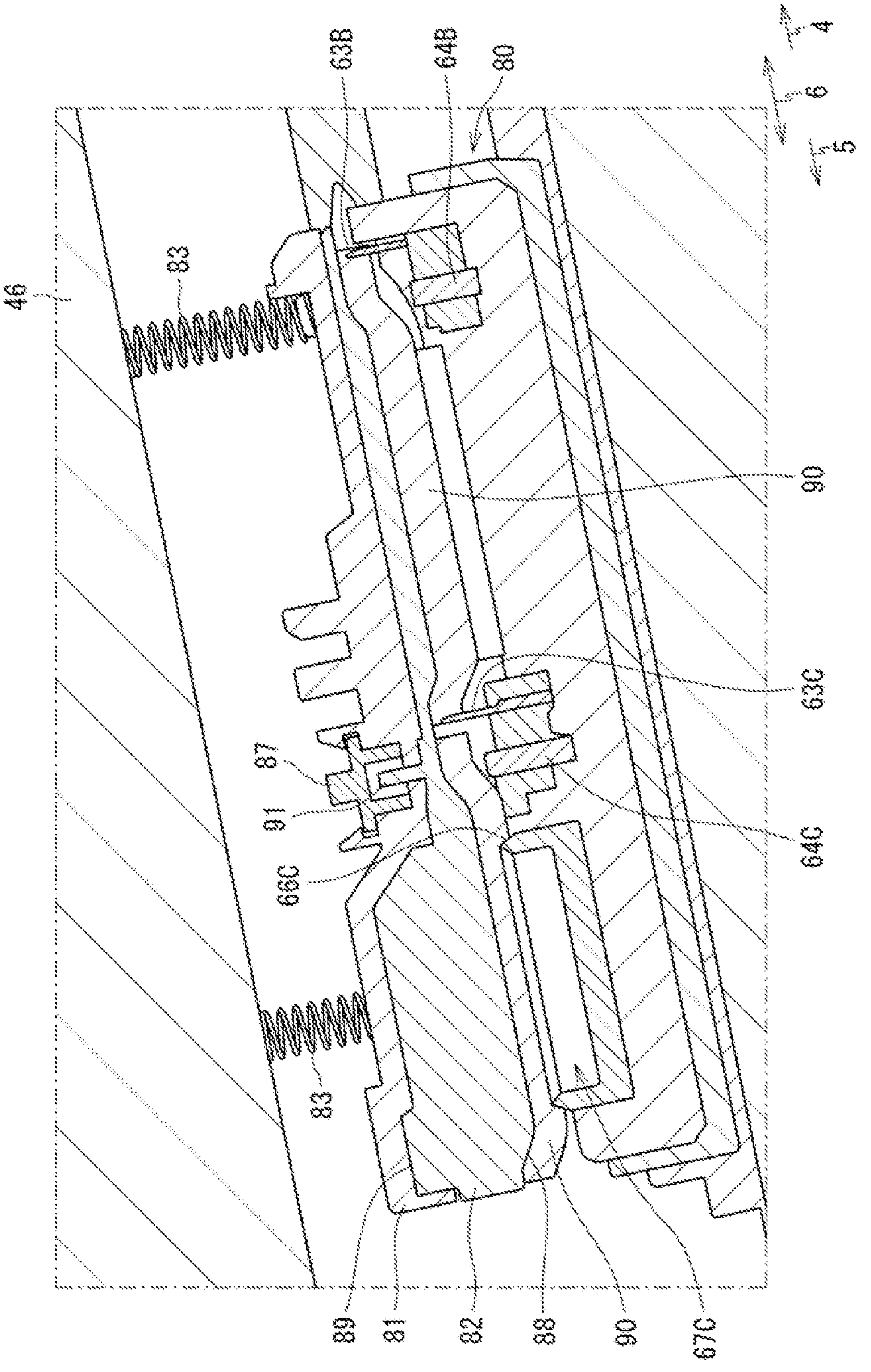
FIG. 14 is an enlarged cross-sectional view of a portion of the wiper cleaning mechanism 80.

As illustrated in FIGS. 2 and 14, the wiper cleaning mechanism 80 is positioned below the support part 46, and includes a support member 81 and a lid member 82. The wiper cleaning mechanism 80 is connected to the lower part of the support part 46 via an elastic member 83. The wiper cleaning mechanism 80 is supported by the support part 46 in an oscillating manner along the orthogonal direction 10.

Figure 11:
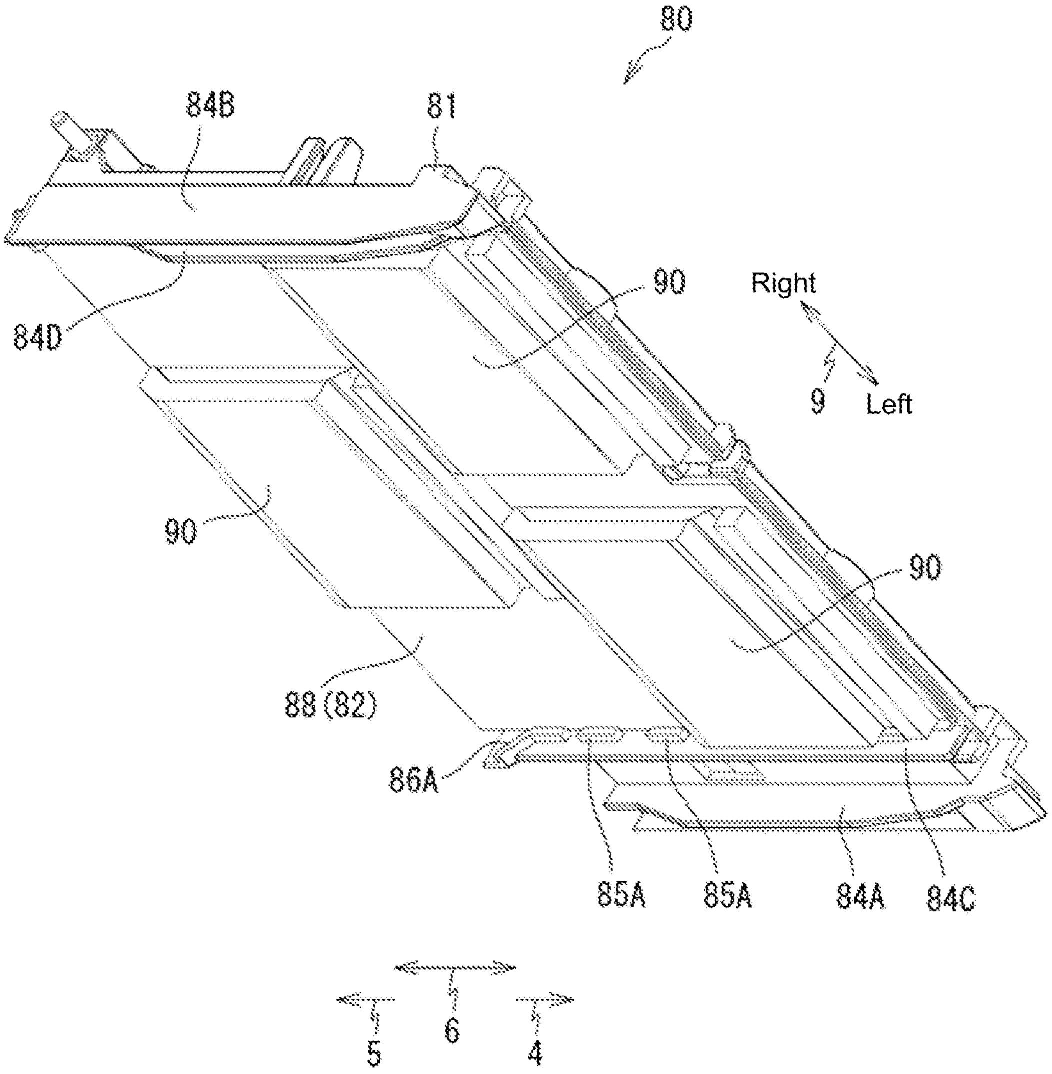
FIG. 11 is a perspective view of the wiper cleaning mechanism 80 as seen from a diagonally lower side.
Figure 12:
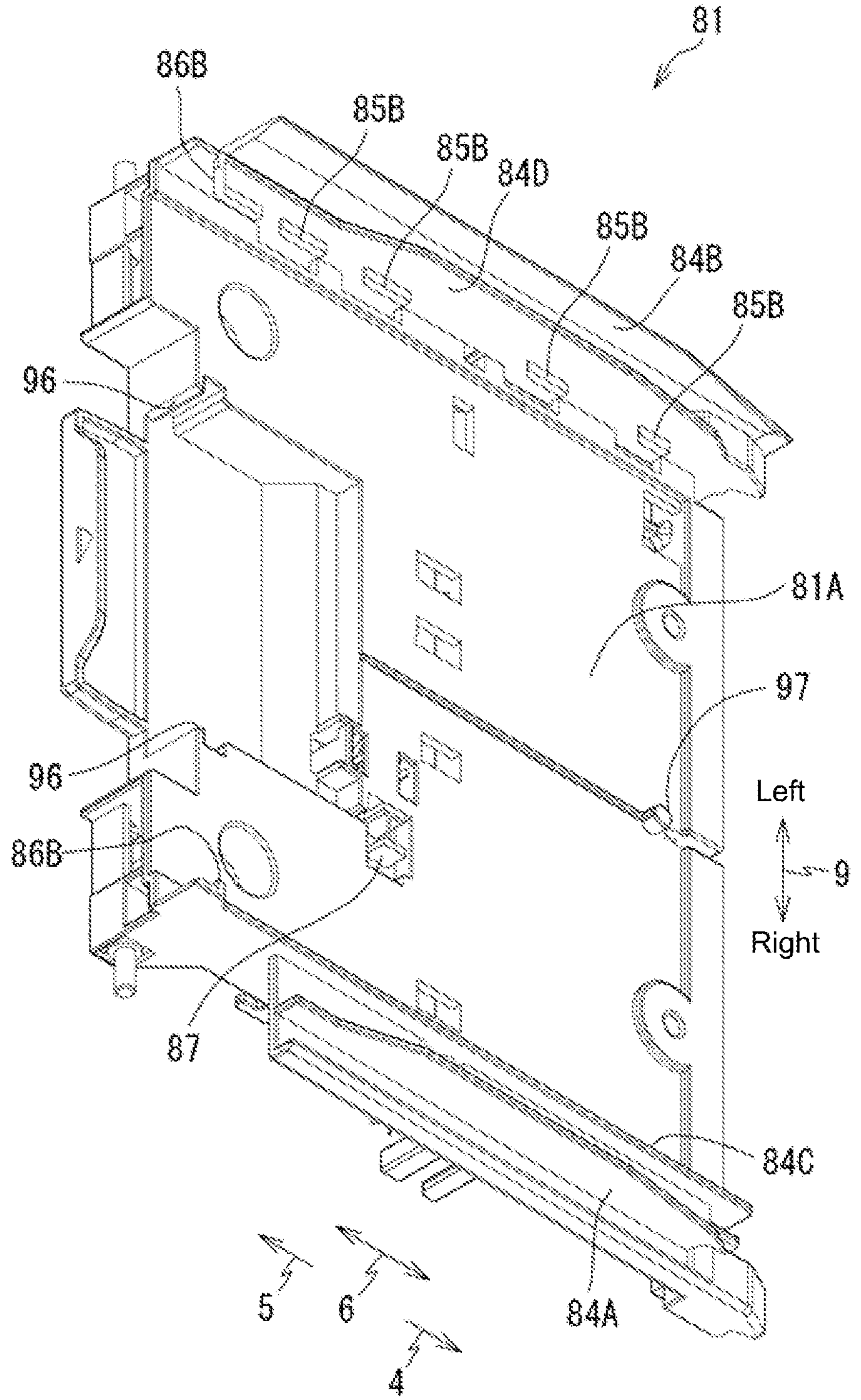
FIG. 12 is a perspective view of the support member 81.

As illustrated in FIGS. 11 and 12, the support member 81 generally has a flat plate shape. The support member 81 has a removable lid member 82. The support member 81 has a facing surface 81A facing the mounted lid member 82, a left edge wall 84A extending downward from the left side edge, a right edge wall 84B extending downward from the right side edge, a left inner wall 84C extending downward at the right side in the left-right direction 9 of the left edge wall 84A, a right inner wall 84D extending downward at the left in the left-right direction 9 of the right edge wall 84B, and a control shaft 97.

The facing surface 81A is the lower side surface of the support member 81. The left inner wall 84C has a support piece 85A and a guide surface 86A. The support piece 85A is a projection protruding from the left inner wall 84C to the right in the left-right direction 9. A plurality of support pieces 85A are arranged along the sloping direction 6.

The guide surface 86A is a protruding part that guides the attachment of the lid member 82 to the support member 81. The guide surface 86A protrudes from the left inner wall 84C to the right in the left-right direction 9. The guide surface 86A is positioned more to a forward sloping direction 5 than the support piece 85A. The guide surface 86A extends at one end side in a rearward sloping direction 4 and the other end side extends so as to separate from the facing surface 81A when moving towards the forward sloping direction 5.

The right inner wall 84D, similar to the left inner wall 84C, has a support piece 85B and a guide surface 86B. The support piece 85B of the right inner wall 84D has the same configuration as the support piece 85A, except for protruding from the right inner wall 84D to the left in the left-right direction 9. The support piece 85A and support piece 85B support the lid member 82 from below. The guide surface 86B of the right inner wall 84D has the same configuration as the guide surface 86A, except for protruding from the right inner wall 84D to the left in the left-right direction 9.

The control shaft 97 controls the movement of the mounted lid member 82 in the rearward sloping direction 4. The control shaft 97 is formed as an axis on the facing surface 81A. The control shaft 97 is positioned at the center position in the left-right direction 9 at the front of the support member 81.

The support member 81 has a mounting sensor 87 that detects that the lid member 82 is mounted (see FIG. 12 and FIG. 14).

As illustrated in FIGS. 2, 11, 13, and 14, the lid member 82 faces the maintenance mechanism 60, which is in the retracted position when mounted on the support member 81. The lid member 82 is generally flat plate-shaped, and has a lower surface 88, an upper surface 89, and a notch part 98.

The lid member 82 has a holding member 90 (an example of a cleaning member) at the lower surface 88. The holding member 90 is formed by a sponge, and holds the first maintenance liquid. The holding member 90 contacts the lip 66 and the rubber wiper 63 in the retracted position (see FIG. 14). As a result, the holding member 90 wipes the ink adhering to the lip 66 and the rubber wiper 63. The holding member 90 seals the internal space 67 of the cap 62 in the retracted position.

Figure 13:
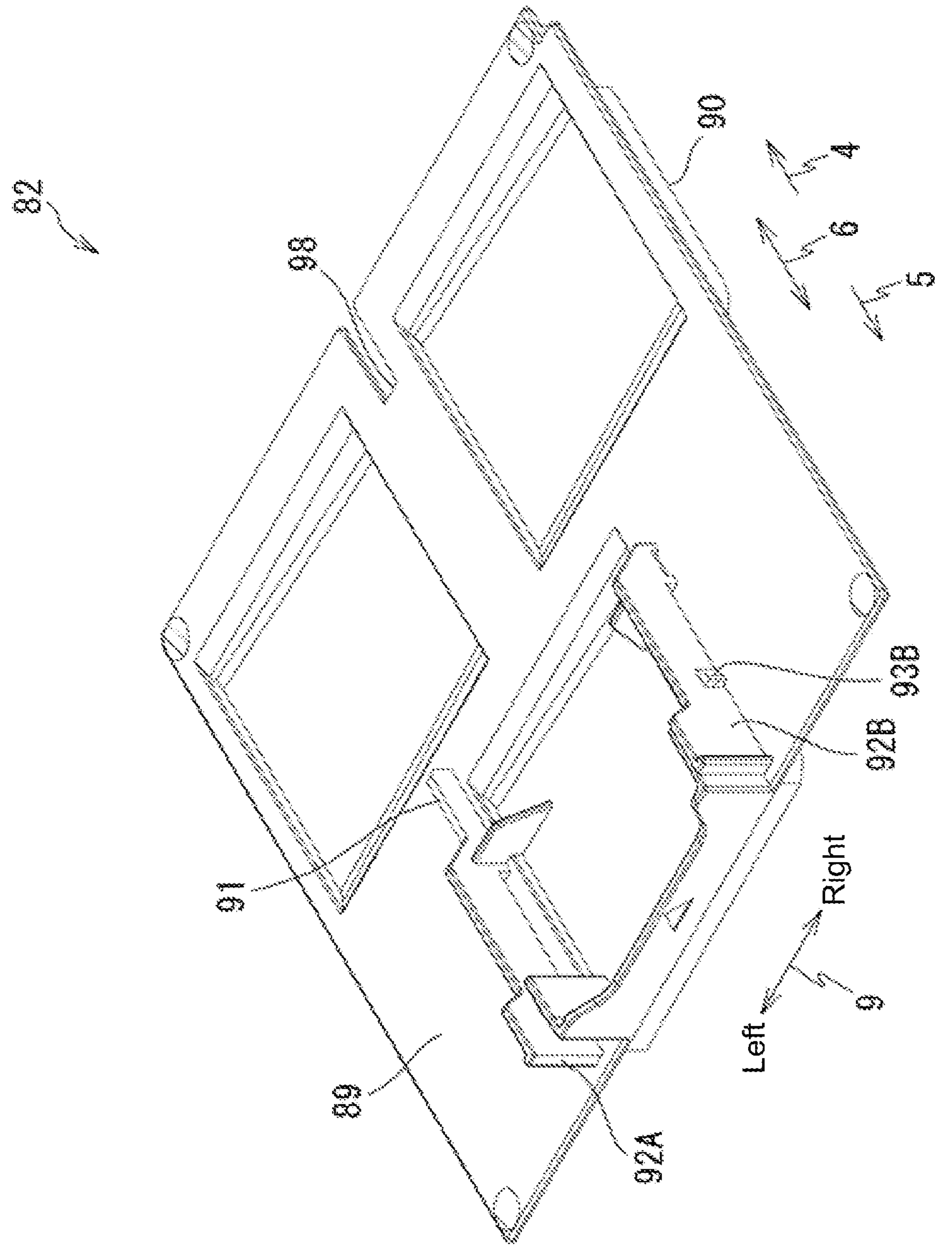
FIG. 13 is a perspective view of the lid member 82.
Figure 15:
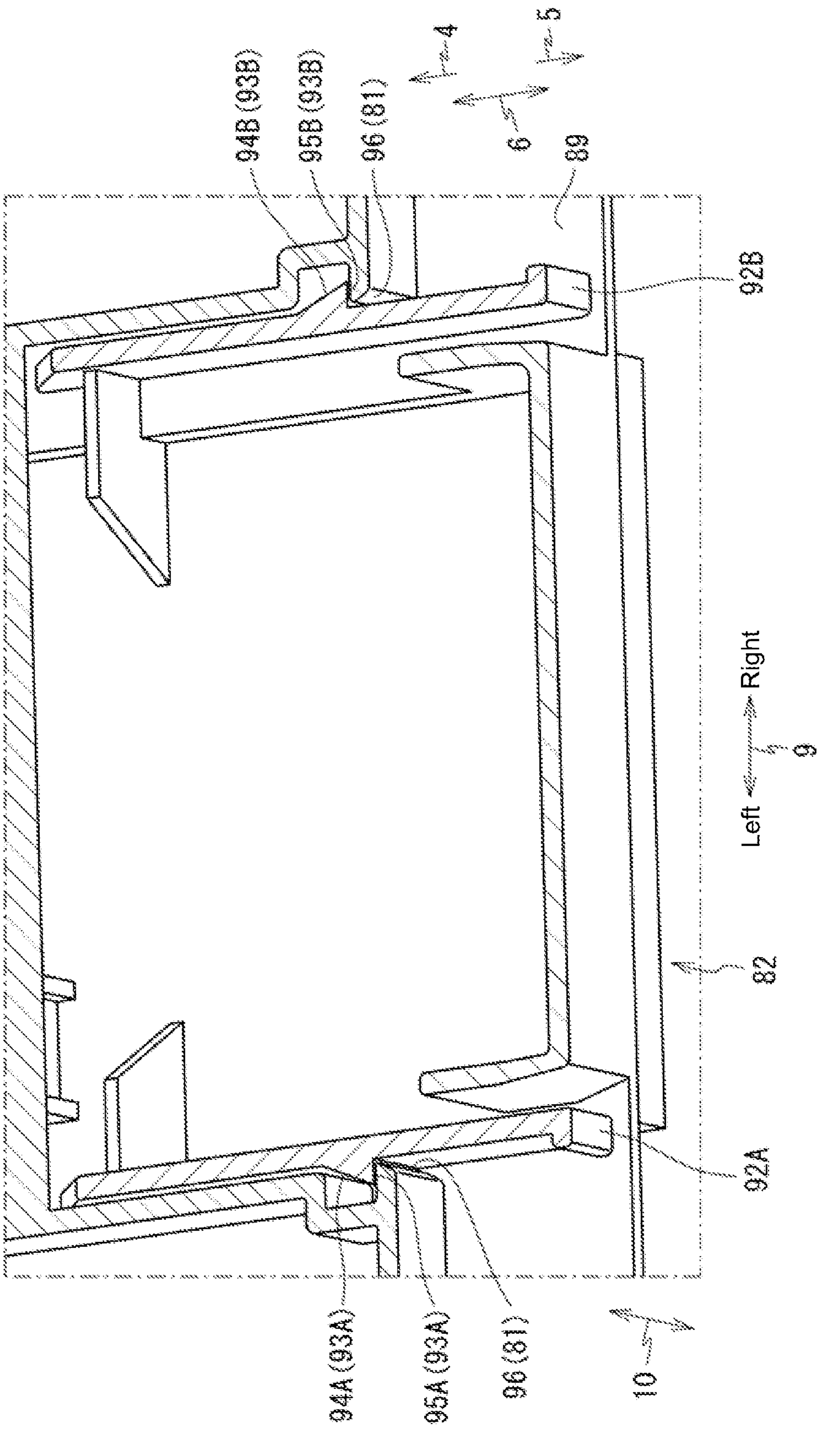
FIG. 15 is a cross-sectional perspective view of the engaging part 93 of the lid member 82 and the operating part 92.

As illustrated in FIGS. 13, 14, and 15, the lid member 82 has a rib 91 protruding toward the support member 81 at the upper surface 89, a left operating part 92A disposed in the left side region of the upper surface 89, and a right operating part 92B disposed in the right side region of the upper surface 89. The left operating part 92A and the right operation part 92B are arranged to be separate in the left-right direction 9 on the forward sloping direction 5 side of the upper surface 89, as a pair of operating parts 92A and 92B. The operating parts 92A, 92B are members that disengage the lid member 82 from the support member 81.

The rib 91 is detectable by the mounting sensor 87 when the lid member 82 is attached to the support member 81. The rib 91 is positioned on the left side region, which is the center of the upper surface 89 in the sloping direction 6. The rib 91 is flat plate-shaped and extends along the sloping direction 6.

The left operating part 92A is flat plate-shaped, and extends along the sloping direction 6 on the upper surface 89. The left operating part 92A is integrally formed with the rib 91. The left operating part 92A has an end part on the rearward sloping direction 4 side that is fixed to the upper surface. In other words, the left operating part 92 can pivot in the left-right direction 9 using the end part on the rearward sloping direction 4 side as a fulcrum. The left operating part 92A has a left engaging part 93A protruding toward the left at the center position in the sloping direction 6.

The left engaging part 93A is formed on the left side surface of the left operating part 92A. The left engaging part 93A has a left contact surface 95A which is a surface that extends in the left-right direction 9 and the orthogonal direction 10, and a left inclined surface 94A that slopes leftward from the left side surface of the left operating part 92A toward the forward sloping direction 5 and connects to the left contact surface 95A.

The right operating part 92B has the same configuration as the left operating part 92A except that a right engaging part 93B protrudes toward the right at the center position in the sloping direction 6.

The right engaging part 93B is formed on the right side surface of the right operating part 92B. The right engaging part 93B includes a right contact surface 95B that is a surface that extends in the left-right direction 9 and the orthogonal direction 10, and a right inclined surface 94B that inclines rightward from the right side surface of the right operating part 92B toward the forward sloping direction 5, and is connected to the right contact surface 95B. The left engaging part 93A and the right engaging part 93B are a pair of engaging parts 93A, 93B that engage with a locking part 96 formed on the support member 81 (see FIGS. 12 and 15).

The notch part 98 contacts the control shaft 97 and restricts the movement of the lid member 82 with respect to the support member 81 in the rearward sloping direction 4. The notch part 98 is positioned at the center position in the left-right direction 9 at the front of the lid member 82. The notch part 98 is open in the rearward sloping direction 4.

When the lid member 82 attached to the support member 81 slides in the forward sloping direction 5 with respect to the support member 81, the contact surfaces 95A and 95B come into contact with the locking parts 96 formed on the support member 81, in order to restrict movement. The user can disengage the engaging parts 93A and 93B from the locking part 96 by moving the left operating part 92A to the right in the left-right direction 9 and moving the right operating part 92B to the left in the left-right direction 9. In this state, the user can slide the lid member 82 in the forward sloping direction 5 in order to release it from the support member 81.

The user can attach the lid member 82 to the support member 81 by moving the insertion tip end of the lid member 82 in the rearward sloping direction 4 along the guide surfaces 86A and 86B. Specifically, when the lid member 82 is inserted into the support member 81, the left engaging part 93A is pushed to the right by the locking part 96, the left operating part 92A is deformed to the right, the right engaging part 93B is pushed leftward by the locking part 96, and the right operating part 92B deforms to the left. When the lid member 82 is pushed further in the rearward sloping direction 4, the engaging parts 93A, 93B overcome the locking part 96, and then the contacting surfaces 95A, 95B engage the locking part 96. At this time, the notch part 98 contacts the control shaft 97, so that the lid member 82 is also controlled in the rearward sloping direction 4 with respect to the support member 81. Note that the operating parts 92A and 92B, the engaging parts 93A and 93B, the locking part 96, the notch part 98, and the control shaft 97 can restrict movement of the lid member 82 attached to the support member 81 in the sloping direction 6, but other known means may be adopted.

[Controller 130]

As illustrated in FIG. 16, the controller 130 has a CPU 131, ROM 132, RAM 133, EEPROM 134 and ASIC 135, which are connected by an internal bus 137. The ROM 132 stores programs and the like for controlling various operations of the CPU 131. The RAM 133 is used as a storage region for temporarily recording data, signals, and the like, used when the CPU 131 executes the above programs, or used as a working region for data processing. The EEPROM 134 stores settings, flags, and the like that should be retained even after the power is turned OFF.

The ASIC 135 is connected to the transport motor 53, head motor 54, first motor 55, second motor 56, return pump motor 47, suction pump motor 58, shaft motor 59, vertical drive motor 163, valve motor 71, operating panel 44, mounting sensor 87, and display part 44A.

The ASIC 135 generates a drive signal for rotating each motor, and controls each motor based on this drive signal. Each motor rotates forward or backward according to a drive signal from the ASIC 135. The controller 130 controls driving of the transport motor 53 to rotate the holder 35, the transport roller 36A, the transport roller 40A, and the drive roller 102. The controller 130 controls driving of the head motor 54 to rotate the screw shaft 29A and move the head 38 along the vertical direction 7. The controller 130 controls driving of the shaft motor 59 to rotate the first support mechanism 51. The controller 130 controls driving of the first motor 55 to rotate the gear 106 of the first support mechanism 51. The controller 130 controls driving of the vertical drive motor 163 to rotate the screw shaft 161 and move the second support mechanism 52 along the orthogonal direction 10. The controller 130 controls driving of the second motor 56 to rotate the gear 120 of the second support mechanism 52. The controller 130 controls the drive of the return pump motor 78 to drive the return pump 75. The controller 130 controls the drive of the suction pump motor 58 to drive the three suction pumps 74. The controller 130 controls the drive of the valve motor 71 to open and close the cap wash valve 72. The controller 130 controls the drive of the valve motor 73 to open and close the cleaning liquid distribution valve 141. The controller 130 controls the drive of the valve motor 79 to open and close the ink valve 142.

The ASIC 35 is connected to the operating panel 44, the display part 44A, and a piezoelectric element (not illustrated in the drawings). The operating panel 44 outputs an operating signal to the controller 130 based on the operation by the user. The operating panel 44 may have, for example, push buttons, or may have a touch sensor superimposed on the display. The display part 44A displays that the lid member 82 is attached to the support member 81. The piezoelectric element operates by being powered by the controller 130 via a drive circuit (not illustrated). The controller 130 controls power supplied to the piezoelectric element to selectively eject ink droplets from the plurality of nozzles 38A.

The ASIC 35 is electrically connected to the mounting sensor 87. The controller 130 detects the insertion and removal of the lid member 82 via the mounting sensor 87.

[Ink]

Details of the ink are described below. The ink contains resin microparticles, a colorant, an organic solvent, a surfactant, and water. The ink is a water-based ink in which resin microparticles, a colorant, and an organic solvent are dissolved in water.

The ink is wet-able to hydrophobic recording media such as coated paper, plastic, film, OHP sheet, and the like, but this is not a limitation. Image recording media other than hydrophobic recording media such as normal paper, glossy paper, matte paper, and the like may be suitable, for example. "Coated paper" refers to plain paper containing mainly pulp, such as high-grade printing paper and intermediate-grade printing paper, coated with a coating agent to improve smoothness, whiteness, gloss, and the like. Specific examples include high-grade coated paper, intermediate-grade coated paper, and the like.

For example, the resin microparticles may contain at least one of methacrylic acid or acrylic acid as a monomer, including commercially available products, for example. The resin microparticles may further contain, for example, styrene, vinyl chloride, and the like as monomers. The resin microparticles may be included in an emulsion, for example. The emulsion is composed of, for example, resin microparticles and a dispersing medium (such as water or the like). The resin microparticles are not dissolved in the dispersing medium, but are within a specific particle size range when dispersed. Examples of resin microparticles include acrylic acid resins, maleic acid ester resins, vinyl acetate resins, carbonate resins, polycarbonate resins, styrene resins, ethylene resins, polyethylene resins, propylene resins, polypropylene resins, urethane resins, polyurethane resins, polyester resins, copolymer resins thereof, and the like, but acrylic resins are preferred.

As the resin microparticles, for example, a resin having a glass transition temperature (Tg) in the range of 0° C. or higher and 200° C. or lower is used. More preferably, the glass transition temperature (Tg) is 20° C. or higher and 180° C. or lower, and still more preferably 30° C. or higher and 150° C. or lower.

The emulsion may be a commercially available product, for example. Commercially available products include, for example, "Superflex (registered trademark) 870" (Tg: 71° C.), and "Superflex (registered trademark) 150" (Tg: 40° C.) manufactured by DKS Co., Ltd.; "Mowinyl (registered trademark) 6760" (Tg: −28° C.) and "Mowinyl (registered trademark) DM774" (Tg: 33° C.) manufactured by Japan Coating Resin Corporation; "Polysol (registered trademark) AP-3270N" (Tg: 27° C.) manufactured by Showa Denko K.K.; "Hirose-X (registered trademark) KE-1062" (Tg: 112° C.) and "Hirose-X (registered trademark) QE-1042" (Tg: 69° C.) manufactured by Seiko PMC Corporation; and the like.

The average particle size of the resin microparticles is, for example, within a range of 30 nm or more and 200 nm or less. The average particle size can be measured as the arithmetic mean diameter using, for example, an LB-550 dynamic light scattering particle size analyzer manufactured by HORIBA, Ltd.

The content (R) of resin microparticles in the total amount of the ink is, for example, preferably in a range of 0.1 wt % or higher and 30 wt % or lower, more preferably in a range of 0.5 wt % or higher and 20 wt % or lower, and particularly preferably within a range of 1.0 wt % or higher and 15.0 wt % or lower. One type of resin microparticles may be used alone, or two or more types may be used in combination.

The colorant is a water dispersible pigment, for example, by means of a resin for pigment dispersion (resin dispersing agent). Examples of colorants include carbon black, inorganic pigments, organic pigments, and the like. Examples of carbon black include furnace black, lamp black, acetylene black, channel black, and the like. Examples of inorganic pigments include titanium dioxide, iron oxide inorganic pigments, carbon black inorganic pigments, and the like. Examples of the aforementioned organic pigments include: azo pigments such as azo lakes, insoluble azo pigments, condensed azo pigments, and chelated azo pigments; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye-type lake pigments and acid dye-type lake pigments; nitro pigments; nitroso pigments; aniline black daylight fluorescent pigments; and the like.

The solid content of the colorant in the total amount of ink is not particularly limited, and can be determined as appropriate depending on, for example, the desired optical density or chroma. The solid content of the colorant is, for example, preferably in a range of 0.1 wt % or more and 20.0 wt % or less, more preferably in a range of 1.0 wt % or more and 15.0 wt % or less. The solid content of the colorant is the weight of the pigment only, and does not include the weight of the resin microparticles. One type of colorant may be used alone, or two or more types may be used in combination.

Organic solvents are solvents that can blend uniformly when the solvent and water are blended at a 1:1 ratio. Any organic solvent can be used without any particular limitation. Examples of organic solvents include propylene glycol, ethylene glycol, 1,2-butanediol, propylene glycol monobutyl ether, dipropylene glycol monopropyl ether, triethylene glycol monobutyl ether, 1,2-hexanediol, 1,6-hexanediol, and the like, but glycol ethers having a propylene oxide group are preferred. Examples of other organic solvents include: alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and the like; alkylene glycols where the alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, and the like; as well as N-methyl-2-pyrrolidone, 2-pyrrolidone, 1,3-dimethyl-2-imidazolidinone and the like.

The organic solvent content to the total amount of ink is, for example, preferably in the range of 1 wt % or more and 70 wt % or less, more preferably in a range of 3 wt % or more and 50 wt % or less.

The water is preferably ion-exchanged water or pure water. The water content in the total amount of ink is, for example, preferably in the range of 15 wt % or more and 95 wt % or less, more preferably in a range of 25 wt % or more and 85 wt % or less. The water content may, for example, be the remainder with regards to other components.

The ink may also contain conventionally known additives as needed. Additives include, for example, surfactants, pH adjusters, viscosity adjusters, surface tension adjusters, preservatives, antifungal agents, leveling agents, antifoaming agents, light stabilizers, antioxidants, nozzle drying inhibitors, polymer components such as emulsions, dyes, and the like. Surfactants may further include cationic surfactants, anionic surfactants, or nonionic surfactants. Commercially available products, for example, may be used as these surfactants. Commercially available products include, for example, "OLFINE (registered trademark) E1010", "OLFINE (registered trademark) E1006", and "OLFINE (registered trademark) E1004" manufactured by Nis sin Chemical Industry Co., Ltd., and the like. The amount of surfactant in the total amount of ink is, for example, 5% by weight or less, 3% by weight or less, or 0.1% by weight to 2% by weight. Examples of the viscosity adjusters include polyvinyl alcohol, cellulose, water-soluble resins, and the like.

The ink can be produced by, for example, uniformly mixing resin microparticles, colorants, organic solvent, water, and, if necessary, other additives by a conventionally known method, and then removing insoluble matter with a filter or the like.

Note that the ink may be fixed to the recording medium by UV irradiation, instead of containing resin microparticles that are fixed to the recording medium by heating. In this case, the ink has a UV curing agent, resin component, colorant, organic solvent, surfactant, and water. UV curing agents include photopolymerization initiators and polymeric compounds.

Photopolymerization initiators are water-soluble compounds that cause polymerization reactions of polymeric compounds by UV irradiation. The photopolymerization initiator is dissolved in water. A state where the photopolymerization initiator is dissolved in water refers to a state in which 1 wt % or more of the photopolymerization initiator is dissolved in 100 g of water. Photopolymerization initiators include, for example, lithium phenyl-2,4,6-trimethylbenzoylphosphinate. Other examples of photopolymerization initiators include 1-[4-(2-hydroxyethoxy)-phenyl]-2-hydroxy-2-methyl-1-propan-1-one, 2-hydroxy-2-methyl 1-phenyl-propan-1-one, hydroxyalkylphenone initiators, acetophenone initiators, benzophenone initiators, benzoin initiators, benzoin ether initiators, aminoalkylphenone initiators, xanthone initiators, oxime initiators, and the like. Examples of hydroxyalkylphenone initiators include 1-hydroxycyclohexylphenyl ketone, 1-(4-isopropylphenyl)-2-hydroxy-2-methylpropan-1-on, and the like. Examples of acetophenone initiators include acetophenone, 2,2-diethoxyacetophenone, p-dimethylaminoacetophene, and the like. Examples of benzophenone initiators include benzophenone, 2-chlorobenzophenone, p,p'-dichlorobenzophene, p,p'-bis-diethylaminobenzophenone, Michler ketones, and the like. Examples of benzoin initiators and benzoin ether initiators include benzoin, benzoin methyl ether, benzoin ethyl ether, benzoin isopropyl ether, benzoin n-propyl ether, benzoin isobutyl ether, benzoin n-butyl ether, and the like. The solid amount of photopolymerization initiators in the total amount of ink is, for example, preferably in a range of 0.1 wt % or higher and 10.0 wt % or lower, more preferably in a range of 0.5 wt % or higher and 5.0 wt % or lower, and particularly preferably within a range of 0.8 wt % or higher and 2.5 wt % or lower.

Polymeric compounds are water-soluble compounds that undergo a polymerization reaction by photopolymerization initiators irradiated with ultraviolet light. The polymeric compounds are dissolved in water. A state where the polymeric compounds are dissolved in water refers to a state in which 1 wt % or more of the polymeric compounds are dissolved in 100 g of water. Examples of polymeric compounds include N,N'-1,2-ethanediylbis {N-[2-(acryloylamino)ethyl]acrylamide}, N,N'-(((2-acrylamido-2((3-(buta-1,3-dien-2-ylamino)propoxy-1,3-diyl)bis(oxy)) bis (propan-3,1-diyl))diacrylamide, N,N-bis(2-acrylamidethyl) acrylamide, and N,N'-{oxybis(2,1-ethanediyloxy-3,1-propanediyl)}bisacrylamide. The solid amount of polymeric compounds in the total amount of ink is, for example, preferably in a range of 1.0 wt % or higher and 40.0 wt % or lower, more preferably in a range of 2.5 wt % or higher and 40.0 wt % or lower, and particularly preferably within a range of 5.0 wt % or higher and 40 wt % or lower.

[First Maintenance Liquid]

The first maintenance liquid is held in the holding member 90 of the wiper cleaning mechanism 80. The first maintenance liquid contains a water-soluble organic solvent, a surfactant, and water.

Any water-soluble organic solvent can be used without any particular limitation. Examples of water-soluble organic solvents include propylene glycol, ethylene glycol, 1,2-butanediol, propylene glycol propyl ether, dipropylene glycol propyl ether, diethylene glycol monobutyl ether, 1,6-hexanediol, and the like, but propylene glycol and 1,2-butanediol are preferred. Examples of other organic solvents include: alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and the like; alkylene glycols where the alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, and the like; as well as N-methyl-2-pyrrolidone, 2-pyrrolidone, 1,3-dimethyl-2-imidazolidinone and the like.

The water-soluble organic solvent may be used alone, or in a combination of two or more types. The amount of water-soluble organic solvent in the total amount of first maintenance liquid is, for example, preferably in a range of 20 wt % or more and 95 wt % or less, more preferably in a range of 45 wt % or more and 85 wt % or less.

Common cationic, anionic, or nonionic surfactants are used as the surfactants, and commercial products may be used. Examples of commercially available nonionic surfactants include OLFINE (registered trademark) manufactured by Nissin Chemical Industry Co. and "EMULGEN (registered trademark)" manufactured by Kao Corporation.

One type of surfactant may be used alone, or a combination of two or more types may be used. The amount of surfactant in the total amount of first maintenance liquid is, for example, preferably in a range of 0.01 wt % or more and 10 wt % or less, more preferably in a range of 0.1 wt % or more and 10 wt % or less.

The water is preferably ion-exchanged water or pure water. The water content in the total amount of the first maintenance liquid is, for example, 10% to 90% by mass, or 20% to 80% by mass. The water content may, for example, be the remainder with regards to other components.

The first maintenance liquid preferably does not contain a coloring agent, but may contain a coloring agent. If the first maintenance liquid contains a coloring agent, the amount is preferably an amount that does not affect the recorded image.

The first maintenance liquid may also contain conventionally known additives as needed. Examples of the additives include pH adjusters, viscosity adjusters, surface tension adjusters, antifungal agents, and the like. Examples of the viscosity adjusters include polyvinyl alcohol, cellulose, water-soluble resins, and the like.

The first maintenance liquid can be prepared by, for example, uniformly mixing a water-soluble organic solvent, a surfactant, and water by a conventionally known method.

[Second Maintenance Liquid]

The second maintenance liquid is stored in the cleaning liquid tank 76. The second maintenance liquid contains a water-soluble organic solvent, a surfactant, and water.

Any water-soluble organic solvent can be used without any particular limitation. Examples of water-soluble organic solvents include propylene glycol, ethylene glycol, 1,2-butanediol, propylene glycol propyl ether, dipropylene glycol propyl ether, diethylene glycol monobutyl ether, 1,6-hexanediol, and the like, but propylene glycol and 1,2-butanediol are preferred. Examples of other organic solvents include: alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and the like; alkylene glycols where the alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, and the like; as well as N-methyl-2-pyrrolidone, 2-pyrrolidone, 1,3-dimethyl-2-imidazolidinone and the like.

The water-soluble organic solvent may be used alone, or in a combination of two or more types. The amount of water-soluble organic solvent in the total amount of the second maintenance liquid is, for example, preferably in a range of 5 wt % or more and 55 wt % or less, more preferably in a range of 25 wt % or more and 35 wt % or less.

Standard cationic surfactants, anionic surfactants, and nonionic surfactants can be used as the surfactants, or a commercial product can be used. Examples of commercially available nonionic surfactants include OLFINE (registered trademark) manufactured by Nissin Chemical Industry Co. and "EMULGEN (registered trademark)" manufactured by Kao Corporation.

One type of surfactant may be used alone, or a combination of two or more types may be used. The amount of surfactant in the total amount of the second maintenance liquid is, for example, preferably in a range of 0.01 wt % or more and 10 wt % or less, more preferably in a range of 1 wt % or more and 10 wt % or less.

The water is preferably ion-exchanged water or pure water. The water content in the total amount of the second maintenance liquid is, for example, 10% to 90% by mass, or 20% to 80% by mass. The water content may, for example, be the remainder with regards to other components.

The second maintenance liquid preferably does not contain a coloring agent, but may contain a coloring agent. If the second maintenance liquid contains a coloring agent, the amount is preferably an amount that does not affect the recorded image.

The second maintenance liquid may also contain conventionally known additives as needed. Examples of the additives include pH adjusters, viscosity adjusters, surface tension adjusters, antifungal agents, and the like. Examples of the viscosity adjusters include polyvinyl alcohol, cellulose, water-soluble resins, and the like.

The second maintenance liquid can be prepared by, for example, uniformly mixing a water-soluble organic solvent, a surfactant, and water by a conventionally known method.

[Difference Between First Maintenance Liquid and Second Maintenance Liquid]

The viscosity V1 of the first maintenance liquid is preferably greater than the viscosity V2 of the second maintenance liquid (V1>V2). Specifically, the viscosity V1 of the first maintenance liquid is, for example, preferably within a range of 5 mPa·s or more and 50 mPa·s or less, and even more preferably in the range of 10 mPa·s to 45 mPa s, and especially preferably in the range of 20 mPa·s or higher to 40 mPa·s or less. The viscosity V2 of the second maintenance liquid is, for example, preferably 1.8 mPa·s or more to 10 mPa·s or less, and more preferably within a range of 1.8 mPa s or more to 5 mPa·s or less. The internal space of the cap 62, the discharge channels 21A, 21B, and 21C, the internal space of the first waste liquid tube 178, the second waste liquid tube 180, and the third waste liquid tube 202 can easily be cleaned by the second maintenance liquid if the viscosity V1 of the first maintenance liquid is higher than the viscosity V2 of the second maintenance liquid. In addition, the viscosity V1 of the first maintenance liquid, the viscosity V2 of the second maintenance liquid, and the viscosity V3 of the ink are preferably in a relationship where viscosity V1>viscosity V3>viscosity V2. Note that the viscosity can be measured, for example, by a cone-plate rotational viscometer.

The evaporation rate E1 of the first maintenance liquid is preferably less than the evaporation rate E2 of the second maintenance liquid (E1<E2). Specifically, the evaporation rate E1 of the first maintenance liquid is, for example, preferably in a range of 0% or more and 50% or less, more preferably in a range of 0% or more and 30% or less, and especially preferably in a range of 0% or more and 10% or less. The evaporation rate E2 of the second maintenance liquid is preferably in the range of, for example, 40% or more and 80% or less, even more preferably within a range of 50% or more and 70% or less. The evaporation rate E1 of the first maintenance liquid is lower than the evaporation rate E2 of the second maintenance liquid; therefore, the first maintenance liquid does not easily evaporate from the holding member 90 of the wiper cleaning mechanism 80. In addition, the evaporation rate E1 of the first maintenance liquid, the evaporation rate E2 of the second maintenance liquid, and the evaporation rate E3 of the ink are preferably in a relationship where evaporation rate E3>evaporation rate E2>evaporation rate E1.

Note that the evaporation rate can be measured by the following test. 5 g of the first maintenance liquid or the second maintenance liquid was placed in a standard glass bottle (No. 2) with a volume of 24 mL, weighed, and left uncovered in a constant temperature bath at a temperature of 60 degrees and a humidity of 40% for 48 hours. Afterwards, the difference when weighed again is expressed as a percentage (%) divided by the initial sample weight (5 g).

The water-soluble organic solvent having the maximum amount in the first maintenance liquid is preferably the same as the water-soluble organic solvent having the maximum amount in the second maintenance liquid. Therefore, when the first maintenance liquid and the second maintenance liquid are mixed, agglomeration or the like will not readily occur.

The surface tension T1 of the first maintenance liquid is preferably greater than the surface tension T3 of the ink. The surface tension T2 of the second maintenance liquid is preferably greater than the surface tension T3. Specifically, the surface tension T1 of the first maintenance liquid is, for example, within a range of 30 mN/m or more to 65 mN/m or less, and more preferably 35 mN/m or more to 50 mN/m or less. The surface tension T2 of the second maintenance liquid is, for example, within a range of mN/m or more to 65 mN/m or less, and more preferably 35 mN/m or more to 50 mN/m or less. The surface tension T3 of the ink is, for example, within a range of 0 mN/m or more to 35 mN/m or less, more preferably 20 mN/m or more to 28 mN/m or less, and particularly preferably within a range of 20 mN/m or more to 25 mN/m or less. Note that the surface tension can be measured, for example, by the Wilhelmy method.

The operation of the maintenance mechanism 60 will be described below together with the purge process, the cleaning process, the wiping process, and the image recording process. In the present embodiment, the second maintenance liquid is supplied and discharged in conjunction with the above processing.

[Purge Process and Cleaning Process]

The image recording device 100 is in a standby state when the image recording process is not being executed. In the standby state, as illustrated in FIG. 17, the head 38 is positioned at the capped position, the first support mechanism 51 is positioned at the first orientation while supporting the maintenance mechanism 60, and the maintenance mechanism 60 is positioned at the maintenance position. At this time, the cap 62 covers the nozzle surface 50.

In the standby state, the controller 130 performs the purge process at prescribed timing or upon receiving an external command. The process when the controller 130 receives an external command to execute the purge process while the image recording device 100 is in the standby state will be described below.

During the purge process, the controller 130 closes the cap cleaning valve 72, and drives the suction pump 74. As a result, the ink inside the nozzle 38A is suctioned out and the ink is discharged from the internal spaces 67A, 67B, 67C of the cap 62 through the discharge channels 21A, 21B, 21C, through the first waste liquid tube 178, the second waste liquid tube 180, and the third waste liquid tube 202, to the waste liquid tank 77. At this time, since the cap cleaning valve 72 is closed, the second maintenance liquid is not supplied from the cleaning liquid tank 76 to the caps 62A, 62B, 62C through the second supply tube 177, the third supply tube 179, and the fourth supply tube 201.

The controller 130 executes the cleaning process (second maintenance process) at prescribed timing, or when an external command has been received. The process when the controller 130 executes the cleaning process, after the purge process is performed and while the image recording device 100 is in the standby state will be described below.

In the cleaning process, the controller 130 drives the suction pump 74 with the cap cleaning valve 72 open and the ink valve 142 closed. As a result, the second maintenance liquid is supplied from the cleaning liquid tank 76 through the second supply tube 177, the third supply tube 179, and the fourth supply tube 201 to the internal spaces of the caps 62A, 62B, and 62C. Since the ink valve 142 is closed, no ink is discharged from the nozzle 38A of the head 38 into the internal spaces of the caps 62A, 62B, 62C.

Next, the controller 130 moves the head 38 to the uncapped position, and drives the suction pump 74 with the cap cleaning valve 72 closed. As a result, the second maintenance liquid is discharged from the internal spaces 67A, 67B, 67C of the cap 62 through the discharge channels 21A, 21B, 21C, through the first waste liquid tube 178, the second waste liquid tube 180, and the third waste liquid tube 202, to the waste liquid tank 77. As a result, ink remaining in the internal spaces 67A, 67B, 67C of the cap 62, the discharge channels 21A, 21B, 21C, the first waste liquid tube 178, the second waste liquid tube 180, and the third waste liquid tube 202 is washed away by the second maintenance liquid.

The controller 130 drives the cleaning liquid distribution valve 141 to keep the atmospheric connecting channel 140 open and drives the return pump 75. Thereby, the second maintenance liquid discharged from the outflow port 174 is returned to the cleaning liquid tank 76 through the return tube 176.

Furthermore, the image recording device 100 is in a standby state when the image recording process is not being executed, but when entering standby state, the controller 130 executes the cleaning liquid supplying process (an example of the third maintenance process) by driving the suction pump 74 in a condition where the cap cleaning valve 72 is open, but the ink valve 142 is closed. The second maintenance liquid is supplied from the cleaning liquid tank 76 through the second supply tube 177, the third supply tube 179, and the fourth supply tube 201 to the internal spaces of the caps 62A, 62B, and 62C in the cleaning liquid supply process. Since the ink valve 142 is closed, no ink is discharged from the nozzle 38A of the head 38 into the internal spaces of the caps 62A, 62B, 62C.

In the cleaning process, the controller 130 drives the suction pump 74 to ensure that the second maintenance liquid flows into the internal spaces of the caps 62A, 62B, 62C at a flow velocity of F1. In the cleaning liquid supplying process, the controller 130 drives a suction pump 74 to ensure that the second maintenance liquid flows into the internal spaces of the caps 62A, 62B, 62C at a flow velocity of F2. The flow velocity F2 is slower than the flow velocity F1 ($F2<F1$).

[Wiping Process]

The controller 130 performs the wiping process with the sponge wipers 64A, 64B, 64C impregnated with the second maintenance liquid, and executes the wiping process (an example of the fourth maintenance process). The wiping process is described below.

In the wiping process, the controller 130 drives the cleaning liquid distribution valve 141 to close the atmospheric connecting channel 140, and drives the return pump 75. As a result, the second maintenance liquid is supplied from the cleaning liquid tank 76 to the support base 61 through the first supply tube 175. The second maintenance liquid supplied to the support base 61 flows into the first channel 153A in the liquid channel 153 through the inflow port 171. The second maintenance liquid that has flowed into the first channel 153A flows through the intermediate channel 153B and the second channel 153C in order, and is discharged from the outflow port 174. At this time, the sponge wipers 64A, 64B, and 64C are impregnated with the second maintenance liquid, and the sponge wipers 64A, 64B, and 64C are in a state of containing sufficient second maintenance liquid. The controller 130 drives the cleaning liquid distribution valve 141 to keep the atmospheric connecting channel 140 open and drives the return pump 75. Thereby, the second maintenance liquid is discharged from the liquid channel 153 to the cleaning liquid tank 76.

The controller 130 moves the head 38 downward from the uncapped position indicated by the dashed line to the wiping position indicated by the solid line in FIG. 18.

The maintenance mechanism 60 at the maintenance position is supported by the first support mechanism 51, and at this time, the rack 154 is engaged with the gear 105. When the first motor 55 is driven in this state and the gear 106 rotates clockwise in FIG. 17, the gear 105 rotates counterclockwise in FIG. 17. As a result, the maintenance mechanism 60 at the maintenance position moves forward (downstream in the transport direction 8A) along the front-to-back direction 8 (transport direction 8A) and reaches the wiping position (see FIG. 18).

In the process of moving the maintenance mechanism 60 from the maintenance position to the wiping position, the tip end parts (upper end parts) of the sponge wiper 64 and the rubber wiper 63 contact the nozzle surface 50 and slide against the nozzle surface 50 of the ejecting module 49. Specifically, the sponge wipers 64A, 64B, 64C and the rubber wipers 63A, 63B, 63C slide in contact with the nozzle surfaces 50 of the ejecting modules 49A, 49B, 49C. As a result, the nozzle surfaces 50 of the ejecting modules 49A, 49B, 49C are wiped by the sponge wipers 64A, 64B, 64C, impregnated with the second maintenance liquid, and then wiped by the rubber wipers 63A, 63B, 63C. As a result, the foreign matter that has adhered to the nozzle surface 50 and the nozzles 38A opened in the nozzle surface 50 is removed, and the second maintenance liquid that has adhered to the nozzle surface 50 is also removed.

When the maintenance mechanism 60 is at the wiping position, the first motor 55 is driven to rotate the gear 106 counterclockwise in FIG. 18, which causes the gear 105 to rotate clockwise in FIG. 18. As a result, the maintenance mechanism 60 at the wiping position moves back (upstream in the transport direction 8A) and reaches the maintenance position (see FIG. 17).

The controller 130 drives the shaft motor 59 to change the orientation of the first support mechanism 51 from the first orientation to the second orientation (see FIG. 19).

[Movement of Maintenance Mechanism 60]

As illustrated in FIGS. 19 and 21, the maintenance mechanism 60 can move to the standby position along the sloping direction 6 by sliding and moving with regard to the first support mechanism 51 in the second orientation and the second support mechanism 52 while being supported by the first support mechanism 51 and the second support mechanism 52 (example of first maintenance process). In other words, the first support mechanism 51 and the second support mechanism 52 can support the maintenance mechanism 60 at the maintenance position, the standby position, and at a position between these two positions.

Specifically, the controller 130 first drives the first motor 55. Therefore, the gear 106 rotates in the clockwise direction in FIG. 19, so the gear 105 rotates counterclockwise, and the maintenance mechanism 60 at the maintenance position moves in the forward sloping direction 5 and is received on the second support mechanism 52 (see FIG. 20).

The controller 130 drives the second motor 56. Therefore, the gear 120 rotates in the clockwise direction in FIG. 20, so gears 118 and 119 rotate counterclockwise, and the maintenance mechanism 60 that has slid from the first support mechanism 51 arrives at the standby position on the second support mechanism 52 (see FIG. 21).

The controller 130 drives the vertical drive motor 163. Thereby, the screw shaft 161 rotates in order to move the second support mechanism 52 upward from the standby position along the orthogonal direction (an example of the direction intersecting with the surface of the holding member 90) 10, so that the maintenance mechanism 60 reaches the retracted position (see FIG. 22). At this time, the support member 81 biases the lid member 82 toward the caps 62A, 62B, 62C by the elastic member 83. The holding member 90 is in contact with the lips 66A, 66B, 66C of the caps 62A, 62B, 62C and the rubber wipers 63A, 63B, 63C. The first maintenance liquid adheres to the lips 66A, 66B, 66C of the caps 62A, 62B, 62C and the rubber wipers 63A, 63B, 63C through the holding member 90, so the ink does not easily solidify. Note that the sponge wipers 64A, 64B, and 64C are separated from the holding member 90.

In addition, the caps 62A, 62B, 62C overlap the area occupied by the heater 39 in the transport direction 8A of the sheet S. More specifically, as illustrated in FIG. 22, a range P1 occupied by the heater 39 in the transport direction 8A (front-to-back direction 8) (hereinafter referred to as the range of the heater 39) overlaps with a range P2 from the front side of the cap 62C in the sloping direction 6 to the back side of the cap 62B in the sloping direction 6 (hereinafter also referred to as the range of the cap 62). With the present embodiment, a case of partial overlap is where the front side portion of the range P1 of the heater 39 overlaps with the rear side portion of the range P2 of the cap 62. At this time, the wiper cleaning mechanism 80 is positioned between the caps 62A, 62B, 62C and the heater 39. Therefore, the heat from the heater 39 is shielded by the wiper cleaning mechanism 80, and is not easily transferred to the caps 62A, 62B, 62C.

[Image Recording Process]

The process (image recording process) when an image is recorded on the sheet S will be described below.

When the controller 130 receives a command to record an image on the sheet S from an external device such as the operating panel 44 or an information processing device connected to the image recording device 100 via a LAN or the like, the controller 130 moves the maintenance mechanism 60 as described above from the maintenance position to the standby position. The controller 130 then drives the vertical drive motor 163 to move the maintenance mechanism 60 from the standby position to the retracted position. The controller 130 drives the shaft motor 59 to change the orientation of the first support mechanism 51 from the second orientation to the first orientation (see FIG. 23).

The controller 130 then moves the head 38 downward from the capped position to the recording position (see FIG. 23). Furthermore, the sheet S begins to move, and the ink is ejected from the nozzles 38A while the sheet S is positioned directly below the head 38. Thus, an image is recorded on the sheet S. The ink that has adhered to the sheet S is fixed to the sheet S by being heated when passing through the heater 39. Furthermore, after the CIS 25 checks the recorded image, the transported sheet S is cut into a prescribed size by the cutter unit 26, and discharged.

After the image recording process on the sheet S, a process that is the reverse of that described above is performed when the maintenance mechanism 60 moves to the maintenance position.

Specifically, first, the controller 130 drives the vertical drive motor 163. As a result, the screw shaft 161 rotates, so the second support mechanism 52 moves from the retracted position downward along the orthogonal direction 10, and the maintenance mechanism 60 reaches the standby position. At this time, the lips 66A, 66B, 66C of the caps 62A, 62B, 62C, the rubber wipers 63A, 63B, 63C, and the sponge wipers 64A, 64B, 64C are separated from the holding member 90 of the lid member 82 (see FIG. 21).

Next, the controller 130 drives the shaft motor 59 to change the orientation of the first support mechanism 51 from the first orientation to the second orientation (see FIG. 21). At this time, the maintenance mechanism 60 is supported by the second support mechanism 52. In this state, the rack 154 is engaged with both gears 118, 119. When the second motor 56 (see FIG. 16) is driven in this state and the gear 120 rotates counterclockwise in FIG. 21, and the gears 118, 119 rotate clockwise in FIG. 21. Thereby, the maintenance mechanism 60 in the standby position is moved in the rearward sloping direction 4 (see FIG. 20).

The controller 130 drives the first motor 55. Therefore, the gear 106 rotates in the counterclockwise direction in FIG. 20, so the gear 105 rotates clockwise, and the maintenance mechanism 60 that has slid from the second support mechanism 52 arrives at the first support mechanism 51 (see FIG. 19).

With the maintenance mechanism 60 supported by the first support mechanism 51, the first support mechanism 51 is rotated from the second orientation to the first orientation by driving the shaft motor 59 (see FIG. 16). Furthermore, the head 38 is moved from the wiping position to the capped position. Thereby, the maintenance mechanism 60 is positioned in the maintenance position (see FIG. 17). The maintenance mechanism 60 at the maintenance position is positioned between the head 38 and the first support mechanism 51 in the first orientation.

[Action and Effect of the Embodiment]

In the present embodiment, the first maintenance liquid cleans the lips 66A, 66B, 66C of the caps 62A, 62B, 62C and the rubber wipers 63A, 63B, 63C, and the second maintenance liquid washes away the ink remaining in the internal spaces 67A, 67B, 67C of the caps 62A, 62B, 62C, the discharge channels 21A, 21B, 21C, the first waste liquid tube 178, the second waste liquid tube 180, and the third waste liquid tube 202. Therefore, suitable maintenance is achieved for each member to which the ink ejected from the nozzle 38A has adhered.

The second maintenance liquid is supplied to the internal spaces 67A, 67B, 67C of the caps 62A, 62B, 62C that contact the nozzle surface 50 at the maintenance position, such that the internal spaces 67A, 67B, 67C are kept at high humidity, and thus the ink does not easily dry in the nozzles 38A.

In addition, the flow velocity F2 at which the second maintenance liquid is supplied to the internal spaces 67A, 67B, 67C of the caps 62A, 62B, 62C when the head 38 is in the uncapped position is slower than the flow velocity F1 at which the second maintenance liquid is supplied to the internal spaces 67A, 67B, 67C of the caps 62A, 62B, 62C in the cleaning process, and therefore the second maintenance liquid does not easily overflow from the internal spaces 67A, 67B, 67C of the caps 62A, 62B, 62C.

In addition, in the wiping process, the nozzle surface 50 of each ejecting module 49A, 49B, 49C is wiped by the sponge wipers 64A, 64B, 64C, and then wiped by the rubber wipers 63A, 63B, 63C, so that the foreign material that has adhered to the nozzle surface 50 and the nozzle 38A that opens on the nozzle surface 50 is removed.

In addition, the total Ta of the volume of the supply channel 20A, the volume of the discharge channel 21A, the volume upstream of the suction pump 74 in the first waste liquid tube 178, and the volume of the internal space of the cap 62A is equal to the total Tb of the volume of the supply channel 20B, the volume of the discharge channel 21B, the volume upstream of the suction pump 74 in the second waste liquid tube 180, and the volume of the internal space of the cap 62B, and the total Tc of the volume of the supply channel 20C, the volume of the discharge channel 21C, the volume upstream of the suction pump 74 in the third waste liquid tube 202, and the volume of the internal space of the cap 62C (total Ta=total Tb=total Tc). Therefore, although the suction pump motor 58 for driving the three suction pumps 74 is in common, the operation of the three suction pumps 74 equalizes the amount of the second maintenance liquid flowing into the internal spaces 67A, 67B, 67C of the caps 62A, 62B, 62C.

Furthermore, the viscosity V2 of the second maintenance liquid is smaller than the viscosity V1 of the first maintenance liquid; therefore, the internal spaces 67A, 67B, 67C of the caps 62A, 62B, 62C, the discharge channels 21A, 21B, 21C, the first waste liquid tube 178, the second waste liquid tube 180, and the third waste liquid tube 202 can easily be cleaned by the second maintenance liquid.

Furthermore, the evaporation rate E1 of the first maintenance liquid is lower than the evaporation rate E2 of the second maintenance liquid; therefore, the first maintenance liquid does not easily evaporate from the holding member 90 of the maintenance mechanism 80. The rubber wipers 63A, 63B, 63C are in contact with the holding member 90 impregnated with the first maintenance liquid; therefore, even if a small amount of ink has adhered to the rubber wipers 63A, 63B, 63C during the wiping process, fixing of the ink on the rubber wipers 63A, 63B, 63C is suppressed. In addition, the evaporation rate E2 of the second maintenance liquid is higher than the evaporation rate E1 of the first maintenance liquid; therefore, the second maintenance liquid tends to evaporate in the internal space 67 of the cap 62 in the cap position, and the internal space 67 is maintained at a high humidity.

Furthermore, the water-soluble organic solvent having the maximum amount in the first maintenance liquid and the water-soluble organic solvent having the maximum amount in the second maintenance liquid are the same, so the first maintenance liquid and the second maintenance liquid will not easily agglomerate when mixed.

MODIFIED EXAMPLES

In the image recording device 100, sponge wiper 64 has three sponge wipers 64A, 64B, 64C, but the number of sponge wipers 64 is not limited to three, so long as the number corresponds to the number of ejecting modules 49A. For example, the number of sponge wipers 64 may be four or more, or two or less. Furthermore, a sponge wiper 64 is not necessarily provided. In the absence of a sponge wiper 64, the nozzle surface 50 is sprayed or contacted with the second maintenance liquid by a mechanism such as a nozzle that sprays the second maintenance liquid or a sponge impregnated with the second maintenance liquid, for example. The second maintenance liquid that has adhered to the nozzle surface 50 is then wiped off by the rubber wiper 63.

In the image recording device 100, the support base 61 is provided with the three rubber wipers 63A, 63B, and 63C, but the number of rubber wipers 63 is not particularly limited as long as it corresponds to the number of the ejecting modules 49A. For example, the number of rubber wipers 63 may be four or more, or two or less. Furthermore, the rubber wiper 63 may be omitted. In the absence of a rubber wiper 63, the nozzle surface 50 may be wiped by a sponge wiper 64, for example.

In the image recording device 100, a holding member 90 is provided on the lower surface 88 of the lid member 82, but the holding member 90 may be omitted. In the absence of a holding member 90, for example, the first maintenance liquid may be brought into contact with and then wiped by the lips 66A, 66B, 66C of the caps 62A, 62B, 62C and the rubber wipers 63A, 63B, 63C, by a mechanism such as a nozzle that sprays the first maintenance liquid or a sponge that is impregnated with the first maintenance liquid.

In the image recording device 100, the support base 61 is provided with the three caps 62A, 62B, and 62C, but the number of caps 62 is not particularly limited as long as it corresponds to the number of the ejecting modules 49A. For example, the number of caps 62 may be four or more, or two or less.

In the image recording device 100, the maintenance mechanism 60 moved to the wiping position by moving forward from the maintenance position, but can move to the wiping position by moving rearward from the maintenance position. In this case, the sponge wiper 64 may be positioned behind the rubber wiper 63.

With the image recording device 100, in the wiping process, the sponge wiper 64 and the rubber wiper 63 moved relative to the head 38 while the head 38 was at the wiping position, but the head 38 may move relative to the sponge wiper 64 and the rubber wiper 63 when the positions of the sponge wiper 64 and the rubber wiper 63 are fixed.

The case was described as an example of an image recording device 100 where the maintenance mechanism 60 is supported by the first support mechanism 51 and the second support mechanism 52, and when the maintenance mechanism 60 moves between the maintenance position and the standby position, the maintenance mechanism is passed between the first support mechanism 51 and the second support mechanism 52. However, the configuration is not limited to this case. The first support mechanism 51 and the second support mechanism 52 may, for example, be formed as a single unit and be capable of changing orientation between the first orientation and the second orientation, and thereby the maintenance mechanism 60 may be supported.

In addition, with the above Embodiments, the ink is described as an example of the liquid, but instead of ink, for example, the liquid can be a pretreatment liquid that is ejected onto the paper prior to the ink during printing, or a post-treatment liquid for overcoating ink that has already adhered to the paper. Furthermore, the storage liquid may be used as a cleaning liquid for cleaning the head 38.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap;

a controller;

a tank storing the second maintenance liquid; and a supply channel configured to supply the second maintenance liquid from the tank to the internal space of the cap, wherein the controller executes:

a first maintenance process in which a first maintenance liquid is brought into contact with the cap in the retracted position and the first wiper;

a second maintenance process in which a second maintenance liquid different from the first maintenance liquid is distributed to the internal space of the cap and the discharge channel, and wherein the second maintenance liquid is supplied to the internal space of the cap through the supply channel to flow out of the discharge channel.

2. The liquid discharging device according to claim 1, further comprising a water-absorbent cleaning member to retain the first maintenance liquid, wherein the controller causes the water-absorbent cleaning member to come into contact with the cap positioned in the retracted position and the first wiper, during the first maintenance process.

3. The liquid discharging device according to claim 1, wherein the controller executes a third maintenance process in which the second maintenance liquid is stored in the internal space of the cap positioned in the covered position.

4. The liquid discharging device according to claim 3, wherein the controller causes:

the second maintenance liquid to flow into the internal space of the cap at a first flow velocity, in the second maintenance process; and the second maintenance liquid to flow into the internal space of the cap at a second flow velocity, in the third maintenance process, wherein the second flow velocity is slower than the first flow velocity.

5. The liquid discharging device according to claim 1, wherein the controller executes a fourth maintenance process in which the nozzle surface is wiped with the first wiper.

6. The liquid discharging device according to claim 5, further comprising:

a water-absorbent second wiper, wherein the second wiper holds the second maintenance liquid, and wherein the controller causes the second wiper to come into contact with the nozzle surface to clean the nozzle surface in the fourth maintenance process.

7. The liquid discharging device according to claim 6, wherein the controller causes the first wiper to wipe the nozzle surface after the second wiper has cleaned the nozzle surface in the fourth maintenance process.

8. The liquid discharging device according to claim 6, further comprising:

a channel to configured to supply the second maintenance liquid to the second wiper, wherein the controller causes the second maintenance liquid to be supplied to the second wiper through the channel and then to be discharged from the channel, in the fourth maintenance process.

9. The liquid discharging device according to claim 1, wherein the liquid discharging device is equipped with a plurality of the heads, a plurality of the caps, a plurality of the supply channels, and a plurality of the discharge channels, wherein each of the supply channels is connected to the internal space of each of the caps, wherein each of the discharge channels is connected to the internal space of each of the caps, wherein the liquid discharge device further comprises a plurality of suction pumps each provided in each of the discharge channels and a motor controlled by the controller to operate the suction pump, and wherein a sum of a volume of the supply channel, a volume upstream of the suction pump in the discharge channel, and a volume of the internal space of the cap is equal for each of the caps.

10. The liquid discharging device according to claim 1, wherein a viscosity of the first maintenance liquid is greater than a viscosity of the second maintenance liquid.

11. The liquid discharging device according to claim 1, wherein an evaporation rate of the first maintenance liquid is lower than an evaporation rate of the second maintenance liquid.

12. The liquid discharging device according to claim 1, wherein each of the first maintenance liquid and the second maintenance liquid comprises at least one water-soluble organic solvent, and a water-soluble organic solvent having the maximum amount in the first maintenance liquid is the same as a water-soluble organic solvent having the maximum amount in the second maintenance liquid.

13. The liquid discharging device according to claim 1, wherein the liquid ejected from the nozzle comprises resin microparticles and water.

14. The liquid discharging device according to claim 13, wherein a viscosity V1 of the first maintenance liquid, a viscosity V2 of the second maintenance liquid, and a viscosity V3 of the liquid ejected from the nozzle are in a relationship of: $V1>V3>V2$.

15. The liquid discharging device according to claim 13, wherein a surface tension T1 of the first maintenance liquid is greater than a surface tension T3 of the liquid ejected from the nozzle; and a surface tension T2 of the second maintenance liquid is greater than the surface tension T3.

16. The liquid discharging device according to claim 13, wherein an evaporation rate E1 of the first maintenance liquid, an evaporation rate E2 of the second maintenance liquid, and an evaporation rate E3 of the liquid ejected from the nozzle are in a relationship of: $E3>E2>E1$.

17. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap, a controller;

wherein the controller executes:

a first maintenance process in which a first maintenance liquid is brought into contact with the cap in the retracted position and the first wiper; and a second maintenance process in which a second maintenance liquid different from the first maintenance liquid is distributed to the internal space of the cap and the discharge channel, and wherein a viscosity of the first maintenance liquid is greater than a viscosity of the second maintenance liquid.

18. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap, a controller;

wherein the controller executes:

a first maintenance process in which a first maintenance liquid is brought into contact with the cap in the retracted position and the first wiper; and a second maintenance process in which a second maintenance liquid different from the first maintenance liquid is distributed to the internal space of the cap and the discharge channel, and wherein an evaporation rate of the first maintenance liquid is lower than an evaporation rate of the second maintenance liquid.

19. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap, a controller;

a tank storing the second maintenance liquid; and a supply channel configured to supply the second maintenance liquid from the tank to the internal space of the cap, wherein the controller executes:

a first maintenance process in which a first maintenance liquid is supplied to the first wiper; and a second maintenance process in which a second maintenance liquid different from the first maintenance liquid is distributed to the internal space of the cap and the discharge channel, and wherein the second maintenance liquid is supplied to the internal space of the cap through the supply channel to flow out of the discharge channel.

20. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap, a controller;

wherein the controller executes:

a first maintenance process in which a first maintenance liquid is supplied to the first wiper; and a second maintenance process in which a second maintenance liquid different from the first maintenance liquid is distributed to the internal space of the cap and the discharge channel, and wherein a viscosity of the first maintenance liquid is greater than a viscosity of the second maintenance liquid.

21. A liquid discharging device, comprising:

a head configured to eject liquid from a nozzle which is an opening in a nozzle surface of the head;

a cap configured to abut against the nozzle surface at a covered position and to separate from the nozzle surface in a retracted position;

a first wiper configured to wipe the nozzle surface;

a discharge channel connecting an internal space of the cap to an outside of the cap, a controller;

wherein the controller executes:

a first maintenance process in which a first maintenance liquid is supplied to the first wiper; and a second maintenance process in which a second maintenance liquid different from the first maintenance liquid is distributed to the internal space of the cap and the discharge channel, and wherein an evaporation rate of the first maintenance liquid is lower than an evaporation rate of the second maintenance liquid.

* * * * *